(12) United States Patent
Saito

(10) Patent No.: US 9,189,459 B2
(45) Date of Patent: Nov. 17, 2015

(54) DOCUMENT IMAGE LAYOUT APPARATUS

(75) Inventor: Kazuyuki Saito, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 1320 days.

(21) Appl. No.: 12/621,501

(22) Filed: Nov. 19, 2009

(65) Prior Publication Data
US 2010/0131841 A1 May 27, 2010

(30) Foreign Application Priority Data
Nov. 20, 2008 (JP) .................... 2008-297244

(51) Int. Cl.
G06F 17/00 (2006.01)
G06F 17/21 (2006.01)

(52) U.S. Cl.
CPC ..................... G06F 17/21 (2013.01)

(58) Field of Classification Search
CPC ............ G06T 7/0081; G06T 2207/20021; G06T 2207/30176; G06T 7/0079; G06K 9/325; G06F 17/212; G06F 17/2229; G06F 17/248; G06F 17/211; G06F 17/21; G06F 17/27
USPC ........... 358/1.18, 538; 382/171, 176; 715/243
See application file for complete search history.

(56) References Cited

U.S. PATENT DOCUMENTS

| | | | | |
|---|---|---|---|---|
| 5,185,813 A | * | 2/1993 | Tsujimoto | 382/180 |
| 5,247,583 A | * | 9/1993 | Kato et al. | 382/164 |
| 5,680,479 A | * | 10/1997 | Wang et al. | 382/176 |
| 5,848,184 A | * | 12/1998 | Taylor et al. | 382/173 |
| 7,308,650 B2 | * | 12/2007 | Yamakado et al. | 715/243 |
| 7,672,022 B1 | * | 3/2010 | Fan | 358/474 |
| 2003/0012438 A1 | * | 1/2003 | Krtolica | 382/173 |
| 2005/0172221 A1 | * | 8/2005 | Kobashi et al. | 715/513 |
| 2005/0188303 A1 | * | 8/2005 | Ayers et al. | 715/517 |
| 2006/0029125 A1 | * | 2/2006 | Kobashi et al. | 375/222 |
| 2006/0140488 A1 | * | 6/2006 | Yasunaga et al. | 382/232 |
| 2006/0156227 A1 | * | 7/2006 | Hosotsubo | 715/517 |
| 2006/0268322 A1 | * | 11/2006 | McGuinness | 358/1.15 |
| 2007/0104366 A1 | * | 5/2007 | Sprague et al. | 382/176 |
| 2007/0229888 A1 | * | 10/2007 | Matsui | 358/1.15 |
| 2009/0109480 A1 | * | 4/2009 | Osaka | 358/1.15 |
| 2010/0275152 A1 | * | 10/2010 | Atkins et al. | 715/788 |

FOREIGN PATENT DOCUMENTS

| | | | |
|---|---|---|---|
| JP | H05-153371 A | 6/1993 | |
| JP | H09-146949 A | 6/1997 | |

* cited by examiner

Primary Examiner — Stephen Hong
Assistant Examiner — Ahamed I Nazar
(74) Attorney, Agent, or Firm — Carter, DeLuca, Farrell & Schmidt, LLP

(57) ABSTRACT

An apparatus includes a protrusion determination unit that determines a protrusion of print data with respect to a data arrangement area, an attribute determination unit that determines whether the attribute of the print data is text or non-text, a segmentation unit that segments text data into block data that can be arranged on at least two or more of data arrangement areas adjacent to each other when the print data is text data, and an arrangement order determination unit that determines an arrangement order of the plurality of block data after segmentation processing with respect to the plurality of data arrangement areas based on the arrangement order of text data prior to segmentation processing.

9 Claims, 40 Drawing Sheets

FIG. 10

| BLOCK ID | WIDTH | HEIGHT |
|---|---|---|
| .... | .... | .... |
| 2B | W | H |
| 2C | W | H |
| 2E | W | H |
| .... | .... | .... |
| .... | .... | .... |
| .... | .... | .... |

FIG. 11B

1102 — ACCORDINGLY, XXX PROPOSES TO CONSTRUCT A NETWORK-BASED DOCUMENT MANAGEMENT ENVIRONMENT. UNDER THE ENVIRONMENT, PAPER-BASED INFORMATION IS CONVERTED INTO ELECTRONIC DATA AND STORED IN THE DOCUMENT MANAGEMENT SYSTEM. IN ADDITION, A NOTIFICATION SYSTEM FOR EMERGENCIES IS ESTABLISHED SO AS TO DEVELOP AN APPROPRIATE INFORMATION ASSET MANAGEMENT ENVIRONMENT.

FIG. 11A

1101 —
SINCE THE LAW FOR THE PROTECTION OF PERSONAL INFORMATION HAS BEEN ENFORCED, COMPANIES HAVE BEEN TAKING COUNTERMEASURES IN THE INFORMATION SECURITY WITH AN ENHANCED AWARENESS OF COMPLIANCE AND CSR. HOWEVER, INCIDENTS OF CLASSIFIED INFORMATION LEAKAGE HAVE NEVER CEASED. AMONG THEM, AS INDICATED BY DATA SHOWING THAT ABOUT HALF OF SUCH LEAKAGE INCIDENTS ARE PAPER-BASED MATTER, THE COUNTERMEASURES AGAINST PAPER DOCUMENTS SHOULD BE URGENTLY ADDRESSED.

IN ORDER TO EFFICIENTLY MANAGE STORES THAT CAN EFFECTIVELY APPEAL TO CONSUMERS, IT IS REQUIRED THAT VARIOUS DATA CREATED BY THE HEADQUARTERS BE TRANSMITTED IN A TIMELY MANNER TO EACH STORE, AND THE ACCUMULATED KNOW-HOW BE SHARED AND UTILIZED AMONG THE STORES.

HOWEVER, DUE TO VARIOUS REASONS SUCH THAT MOST OF THE STORES ARE PRESENT AT DIFFERENT LOCATIONS, THERE IS A LARGELY DIFFERENT PRODUCT LINEUP AMONG THE STORES, AND THE WORKLOAD INCURRED AT A FIELD SITE IS HEAVY BECAUSE OF THE LIMITED HUMAN RESOURCE, IT OFTEN OCCURS THAT AN EFFECTIVE MANAGEMENT TAILORED TO THE CHARACTERISTIC OF A STORE CANNOT BE IMPLEMENTED.

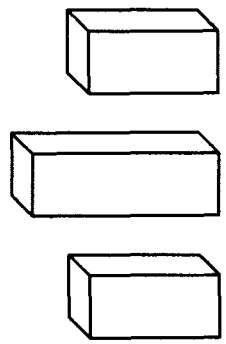

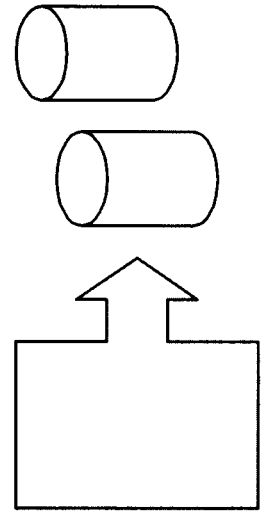

FIG. 12

SINCE THE LAW FOR THE PROTECTION OF PERSONAL INFORMATION HAS BEEN ENFORCED, COMPANIES HAVE BEEN TAKING COUNTERMEASURES IN THE INFORMATION SECURITY WITH AN ENHANCED AWARENESS OF COMPLIANCE AND CSR. HOWEVER, INCIDENTS OF CLASSIFIED INFORMATION LEAKAGE HAVE NEVER CEASED. AMONG THEM, AS INDICATED BY DATA SHOWING THAT ABOUT HALF OF SUCH LEAKAGE INCIDENTS ARE PAPER-BASED MATTER, THE COUNTERMEASURES AGAINST PAPER DOCUMENTS SHOULD BE URGENTLY ADDRESSED.

IN ORDER TO EFFICIENTLY MANAGE STORES THAT CAN EFFECTIVELY APPEAL TO CONSUMERS, IT IS REQUIRED THAT VARIOUS DATA CREATED BY THE HEADQUARTERS BE TRANSMITTED IN A TIMELY MANNER TO EACH STORE, AND THE ACCUMULATED KNOW-HOW BE SHARED AND UTILIZED AMONG THE STORES.

HOWEVER, DUE TO VARIOUS REASONS SUCH THAT MOST OF THE STORES ARE PRESENT AT DIFFERENT LOCATIONS, THERE IS A LARGELY DIFFERENT PRODUCT LINEUP AMONG THE STORES, AND THE WORKLOAD INCURRED AT A FIELD SITE IS HEAVY BECAUSE OF THE LIMITED HUMAN RESOURCE, IT OFTEN OCCURS THAT AN EFFECTIVE MANAGEMENT TAILORED TO THE CHARACTERISTIC OF A STORE CANNOT BE IMPLEMENTED.

~1201

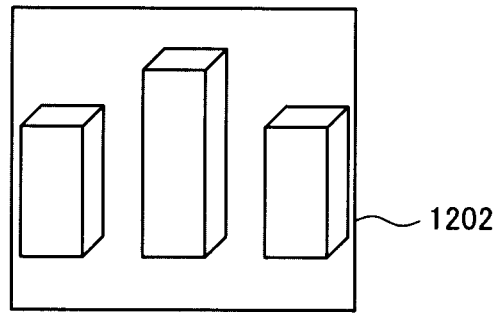

| ARTICLE ID | SEGMENTED AREA ID | DATA ATTRIBUTE | BARYCENTRIC COORDINATE | TEXT ROW DIRECTION | HORIZONTAL PROTRUSION AMOUNT | HORIZONTAL PROTRUSION RATIO | VERTICAL PROTRUSION AMOUNT | VERTICAL PROTRUSION RATIO |
|---|---|---|---|---|---|---|---|---|
| ..... | ..... | ..... | ..... | ..... | ..... | ..... | ..... | ..... |
| 2 | 210 | TEXT | (X21, Y21) | VERTICAL WRITING | -40 | 0.6 | +160 | 2.6 |
| 3 | 310 | NON-TEXT | (X31, Y31) | – | – | – | – | – |
| 3 | 320 | TEXT | (X32, Y32) | HORIZONTAL WRITING | +10 | 1.1 | +70 | 1.7 |
| 4 | 410 | TEXT | (X41, Y41) | HORIZONTAL WRITING | +35 | 1.35 | +310 | 3.1 |
| ..... | ..... | ..... | ..... | ..... | ..... | ..... | ..... | ..... |

| SEGMENTED AREA ID | BLOCK ID | PAGE NUMBER | IN-PAGE ARRANGEMENT POSITION SYMBOL |
|---|---|---|---|
| ..... | ..... | ..... | ..... |
| 210 | 221001 | 1 | 2E |
| 210 | 221002 | 1 | 3E |
| 310 | 331001 | 1 | 2B |
| 320 | 332001 | 1 | 2C |
| 320 | 332002 | 1 | 2D |
| ..... | ..... | ..... | ..... |

SINCE THE LAW FOR THE PROTECTION OF PERSONAL INFORMATION HAS BEEN
ENFORCED, COMPANIES HAVE BEEN TAKING COUNTERMEASURES IN THE INFORMATION
SECURITY WITH AN ENHANCED AWARENESS OF COMPLIANCE AND CSR. HOWEVER,
INCIDENTS OF CLASSIFIED INFORMATION LEAKAGE HAVE NEVER CEASED. AMONG THEM,
AS INDICATED BY DATA SHOWING THAT ABOUT HALF OF SUCH LEAKAGE INCIDENTS ARE
PAPER-BASED MATTER, THE COUNTERMEASURES AGAINST PAPER DOCUMENTS SHOULD
BE URGENTLY ADDRESSED.

IN ORDER TO EFFICIENTLY MANAGE STORES THAT CAN EFFECTIVELY APPEAL TO
CONSUMERS, IT IS REQUIRED THAT VARIOUS DATA CREATED BY THE HEADQUARTERS
BE TRANSMITTED IN A TIMELY MANNER TO EACH STORE, AND THE ACCUMULATED
KNOW-HOW BE SHARED AND UTILIZED AMONG THE STORES.

HOWEVER, DUE TO VARIOUS REASONS SUCH THAT MOST OF THE STORES ARE PRESENT
AT DIFFERENT LOCATIONS, THERE IS A LARGELY DIFFERENT PRODUCT LINEUP AMONG
THE STORES, AND THE WORKLOAD INCURRED AT A FIELD SITE IS HEAVY BECAUSE OF
THE LIMITED HUMAN RESOURCE, IT OFTEN OCCURS THAT AN EFFECTIVE MANAGEMENT
TAILORED TO THE CHARACTERISTIC OF A STORE CANNOT BE IMPLEMENTED.

1604 —
```
SINCE THE LAW FOR THE
PROTECTION OF PERSONAL
INFORMATION HAS BEEN
ENFORCED, COMPANIES HAVE
BEEN TAKING COUNTERMEASURES
IN THE INFORMATION
SECURITY WITH AN ENHANCED
AWARENESS OF COMPLIANCE
AND CSR. HOWEVER,
INCIDENTS OF CLASSIFIED
INFORMATION LEAKAGE HAVE
NEVER CEASED. AMONG THEM,
AS INDICATED BY DATA
SHOWING THAT ABOUT HALF OF
SUCH LEAKAGE INCIDENTS ARE
PAPER-BASED MATTER, THE
COUNTERMEASURES AGAINST
PAPER DOCUMENTS SHOULD
```

1605 —
```
BE URGENTLY ADDRESSED.
IN ORDER TO EFFICIENTLY
MANAGE STORES THAT CAN
EFFECTIVELY APPEAL TO
CONSUMERS, IT IS REQUIRED
THAT VARIOUS DATA CREATED
BY THE HEADQUARTERS
BE TRANSMITTED IN A TIMELY
MANNER TO EACH STORE,
AND THE ACCUMULATED
KNOW-HOW BE SHARED AND
UTILIZED AMONG THE STORES.
HOWEVER, DUE TO VARIOUS
REASONS SUCH THAT MOST OF
THE STORES ARE PRESENT
AT DIFFERENT LOCATIONS,
THERE IS A LARGELY DIFFERENT
PRODUCT LINEUP AMONG
THE STORES, AND THE
WORKLOAD INCURRED AT A FIELD
SITE IS HEAVY BECAUSE OF
THE LIMITED HUMAN
RESOURCE, IT OFTEN OCCURS
THAT AN EFFECTIVE MANAGEMENT
TAILORED TO THE
CHARACTERISTIC OF A STORE
CANNOT BE IMPLEMENTED.
```

1606 —
```
SINCE THE LAW FOR THE
PROTECTION OF PERSONAL
INFORMATION HAS BEEN
ENFORCED, COMPANIES HAVE
BEEN TAKING COUNTERMEASURES
IN THE INFORMATION
SECURITY WITH AN ENHANCED
AWARENESS OF COMPLIANCE
AND CSR. HOWEVER,
```
```
INCIDENTS OF CLASSIFIED
INFORMATION LEAKAGE HAVE
NEVER CEASED. AMONG THEM,
AS INDICATED BY DATA
SHOWING THAT ABOUT HALF OF
SUCH LEAKAGE INCIDENTS ARE
PAPER-BASED MATTER, THE
COUNTERMEASURES AGAINST
PAPER DOCUMENTS SHOULD
```
```
BE URGENTLY ADDRESSED.
IN ORDER TO EFFICIENTLY
MANAGE STORES THAT CAN
EFFECTIVELY APPEAL TO
CONSUMERS, IT IS REQUIRED
THAT VARIOUS DATA CREATED
BY THE HEADQUARTERS
BE TRANSMITTED IN A TIMELY
MANNER TO EACH STORE,
```
```
AND THE ACCUMULATED
KNOW-HOW BE SHARED AND
UTILIZED AMONG THE STORES.
HOWEVER, DUE TO VARIOUS
REASONS SUCH THAT MOST OF
THE STORES ARE PRESENT
AT DIFFERENT LOCATIONS,
THERE IS A LARGELY DIFFERENT
PRODUCT LINEUP AMONG
```
```
THE STORES, AND THE
WORKLOAD INCURRED AT A FIELD
SITE IS HEAVY BECAUSE OF
THE LIMITED HUMAN
RESOURCE, IT OFTEN OCCURS
THAT AN EFFECTIVE MANAGEMENT
TAILORED TO THE
CHARACTERISTIC OF A STORE
CANNOT BE IMPLEMENTED.
```

FIG. 22A

| ARTICLE ID | SEGMENTED AREA ID | AREA ATTRIBUTE | BARYCENTRIC COORDINATE | TEXT ROW DIRECTION | ... | GROUP BLOCK ID | IN-PAGE ARRANGEMENT POSITION | EXTRACTED SEGMENT |
|---|---|---|---|---|---|---|---|---|
| ... | ... | ... | ... | ... | ... | ... | ... | ... |
| 2 | 210 | TEXT | (X21, Y21) | VERTICAL WRITING | ... | ... | ... | ... |
| 3 | 310 | NON-TEXT | (X31, Y31) | — | ... | ... | ... | ... |
| 3 | 320 | TEXT | (X32, Y32) | HORIZONTAL WRITING | ... | ... | ... | ... |
| 4 | 410 | TEXT | (X41, Y41) | HORIZONTAL WRITING | ... | ... | ... | ... |
| ... | ... | ... | ... | ... | ... | ... | ... | ... |

| SEGMENTED AREA ID | BLOCK ID | PAGE NUMBER | IN-PAGE ARRANGEMENT POSITION SYMBOL | TREATMENT FLAG |
|---|---|---|---|---|
| .... | .... | .... | .... | .... |
| 210 | 221001 | 1 | 2E | DONE |
| 210 | 221002 | 1 | 3E | DONE |
| 310 | 331001 | 1 | 2B | DONE |
| 320 | 332001 | 1 | 2C | DONE |
| 320 | 332002 | 1 | 2D | DONE |
| .... | .... | .... | .... | .... |

FIG. 22C

| ARTICLE ID | SEGMENTED AREA ID | AREA ATTRIBUTE | BARYCENTRIC COORDINATE | TEXT ROW DIRECTION | ... | GROUP BLOCK ID | IN-PAGE ARRANGEMENT POSITION | EXTRACTED SEGMENT |
|---|---|---|---|---|---|---|---|---|
| ... | ... | ... | ... | ... | ... | ... | ... | ... |
| 2 | 210 | TEXT | (X21, Y21) | VERTICAL WRITING | ... | 221001, 221002 | 2E, 3E | (x4, y1)(x4, y3), (x5, y1)(x5, y3), (x4, y1)(x5, y1), (x4, y3)(x5, y3) |
| 3 | 310 | NON-TEXT | (X31, Y31) | — | ... | 331001, 332001, 332002 | 2B, 2C, 2D | (x1,y1)(x1,y2), (x4,y1)(x4,y2), (x1,y1)(x4,y1), (x1,y2)(x4,y2) |
| 3 | 320 | TEXT | (X32, Y32) | HORIZONTAL WRITING | ... | 331001, 332001, 332002 | 2B, 2C, 2D | (x1,y1)(x1,y2), (x4,y1)(x4,y2), (x1,y1)(x4,y1), (x1,y2)(x4,y2) |
| 4 | 410 | TEXT | (X41, Y41) | HORIZONTAL WRITING | ... | ... | ... | ... |
| ... | ... | ... | ... | ... | ... | ... | ... | ... |

2203

FIG. 25
| BACKGROUND NUMBER | COLOR (R,G,B) | PATTERN |
|---|---|---|
| .... | .... | .... |
| 2 | (153, 204, 0) |  |
| 3 | (255, 204, 0) |  |
| 4 | (0, 255, 255) |  |
| .... | .... | .... |

FIG. 31A

| ARTICLE ID | SEGMENTED AREA ID | AREA ATTRIBUTE | BARYCENTRIC COORDINATE | TEXT ROW DIRECTION | GROUP BLOCK ID | IN-PAGE ARRANGEMENT POSITION | EXTRACTED SEGMENT |
|---|---|---|---|---|---|---|---|
| ⋮ | ⋮ | ⋮ | ⋮ | ⋮ | ⋮ | ⋮ | ⋮ |
| 2 | 210 | TEXT | (X21, Y21) | VERTICAL WRITING | 221011 | 2E, 3E | ⋮ |
| 3 | 310 | NON-TEXT | (X31, Y31) | — | 331001 | 2B | ⋮ |
| 3 | 320 | TEXT | (X32, Y32) | HORIZONTAL WRITING | 331012 | 2C, 2D | ⋮ |
| 4 | 410 | TEXT | (X41, Y41) | HORIZONTAL WRITING | ⋮ | ⋮ | ⋮ |
| ⋮ | ⋮ | ⋮ | ⋮ | ⋮ | ⋮ | ⋮ | ⋮ |

| SEGMENTED AREA ID | BLOCK ID | PAGE NUMBER | IN-PAGE ARRANGEMENT POSITION SYMBOL | TREATMENT FLAG |
|---|---|---|---|---|
| ⋮ | ⋮ | ⋮ | ⋮ | |
| 210 | 221011 | 1 | 2E, 3E | DONE |
| 210 | 221011 | 1 | 2E, 3E | DONE |
| 310 | 331001 | 1 | 2B | DONE |
| 320 | 331012 | 1 | 2C, 2D | DONE |
| 320 | 331012 | 1 | 2C, 2D | DONE |
| ⋮ | ⋮ | ⋮ | ⋮ | |

| ARTICLE ID | SEGMENTED AREA ID | AREA ATTRIBUTE | BARYCENTRIC COORDINATE | TEXT ROW DIRECTION | ... | GROUP BLOCK ID | IN-PAGE ARRANGEMENT POSITION | EXTRACTED SEGMENT |
|---|---|---|---|---|---|---|---|---|
| ... | ... | ... | ... | ... | ... | ... | ... | ... |
| 2 | 210 | TEXT | (X21, Y21) | VERTICAL WRITING | ... | 221011 | 2E, 3E | ... |
| 3 | 310 | NON-TEXT | (X31, Y31) | — | ... | 331021 | 2B, 2C, 2D | ... |
| 3 | 320 | TEXT | (X32, Y32) | HORIZONTAL WRITING | ... | 331021 | 2B, 2C, 2D | ... |
| 4 | 410 | TEXT | (X41, Y41) | HORIZONTAL WRITING | ... | | | ... |
| ... | ... | ... | ... | ... | ... | ... | ... | ... |

| SEGMENTED AREA ID | BLOCK ID | PAGE NUMBER | IN-PAGE ARRANGEMENT POSITION SYMBOL | TREATMENT FLAG |
|---|---|---|---|---|
| ... | ... | ... | ... | |
| 210 | 221011 | 1 | 2E, 3E | DONE |
| 210 | 221011 | 1 | 2E, 3E | DONE |
| 310 | 331021 | 1 | 2B, 2C, 2D | DONE |
| 320 | 331021 | 1 | 2B, 2C, 2D | DONE |
| 320 | 331021 | 1 | 2B, 2C, 2D | DONE |
| ... | ... | ... | ... | |

FIG. 33

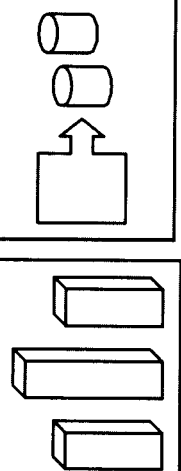

3301 — SINCE THE LAW FOR THE PROTECTION OF PERSONAL INFORMATION HAS BEEN ENFORCED, COMPANIES HAVE BEEN TAKING COUNTERMEASURES IN THE INFORMATION SECURITY WITH AN ENHANCED AWARENESS OF COMPLIANCE AND CSR. HOWEVER, INCIDENTS OF CLASSIFIED INFORMATION LEAKAGE HAVE NEVER CEASED. AMONG THEM, AS INDICATED BY DATA SHOWING THAT ABOUT HALF OF SUCH LEAKAGE INCIDENTS ARE PAPER-BASED MATTER, THE COUNTERMEASURES AGAINST PAPER DOCUMENTS SHOULD BE URGENTLY ADDRESSED. IN ORDER TO EFFICIENTLY MANAGE STORES THAT CAN EFFECTIVELY APPEAL TO CONSUMERS, IT IS REQUIRED THAT VARIOUS DATA CREATED BY THE HEADQUARTERS BE TRANSMITTED IN A TIMELY MANNER TO EACH STORE, AND THE ACCUMULATED KNOW-HOW BE SHARED AND UTILIZED AMONG THE STORES.HOWEVER, DUE TO VARIOUS REASONS SUCH THAT MOST OF THE STORES ARE PRESENT AT DIFFERENT LOCATIONS, THERE IS A LARGELY DIFFERENT PRODUCT LINEUP AMONG THE STORES, AND THE WORKLOAD INCURRED AT A FIELD SITE IS HEAVY BECAUSE OF THE LIMITED HUMAN RESOURCE, IT OFTEN OCCURS THAT AN EFFECTIVE MANAGEMENT TAILORED TO THE CHARACTERISTIC OF A STORE CANNOT BE IMPLEMENTED.

3302 — ACCORDINGLY, XXX PROPOSES TO CONSTRUCT A NETWORK-BASED DOCUMENT MANAGEMENT ENVIRONMENT. UNDER THE ENVIRONMENT, PAPER-BASED INFORMATION IS CONVERTED INTO ELECTRONIC DATA AND STORED IN THE DOCUMENT MANAGEMENT SYSTEM. IN ADDITION, A NOTIFICATION SYSTEM FOR EMERGENCIES IS ESTABLISHED SO AS TO DEVELOP AN APPROPRIATE INFORMATION ASSET MANAGEMENT ENVIRONMENT.

3303 — A PAPER DOCUMENT IS SCANNED INTO A DATABASE AS AN ELECTRONIC FILE. FURTHERMORE, A DOCUMENT MANAGEMENT SYSTEM IS CONSTRUCTED ON AN IN-HOUSE NETWORK, AND AN ACCESS RIGHT IS SET IN FILE UNIT SO AS TO CONTROL ACCESS AUTHORITY. ALSO, BY PROVIDING A FUNCTION THAT NOTIFIES AN ADMINISTRATOR VIA E-MAIL IN THE EVENT OF EMERGENCIES SUCH AS UNAUTHORIZED FILE COPY, A RAPID-RESPONSE SUPPORT IS PROVIDED IN THE CASE OF INFORMATION LEAKAGE. SUCH MEASURES ARE AT FIRST INTRODUCED ON A SMALL SCALE SUCH AS DEPARTMENT LEVEL AND THEN INTRODUCED ENTIRELY BY ADDING LICENSES AFTER THE ESTABLISHMENT OF BUSINESS PROCESS. WITH THIS PROCEDURE, AN EFFICIENT WORK STYLE TRANSITION CAN BE ACHIEVED.

IMPROVEMENTS IN WORK STYLE CHANGE STAFF MENTALITY. BY CHANGING FROM A PAPER -DEPENDENT WORK STYLE TO A NETWORK-BASED WORK STYLE, AN OPTIMIZED INFORMATION SHARING ENVIRONMENT CAN BE REALIZED. WITH A WORK STYLE DEALING WITH ELECTRONIC DATA, STAFF MENTALITY FOR INFORMATION SHARING IMPROVES, AND THEREBY EFFECTS MAKING STAFFS MORE CONSCIOUS ABOUT THE SECURITY MAY ALSO BE PROVIDED. AN APPROPRIATE INFORMATION MANAGEMENT STRUCTURE CAN BE CONSTRUCTED BASED ON ACCESS RIGHT SETTINGS. A SECURE INFORMATION MANAGEMENT IS REALIZED SO AS TO CONTROL A FILE ACCESS RIGHT ACCORDING TO THE ACCOUNT. CONSEQUENTLY, THE CONSTRUCTION OF INFRASTRUCTURE IS ACHIEVED THAT ENABLES DEVELOPING COUNTERMEASURES IN ACCORDANCE WITH THE LAW FOR THE PROTECTION

3304 — OF PERSONAL INFORMATION AND EFFORTS TOWARD ACQUISITION OF PRIVACY MARK CERTIFICATION, AND THE COMPANY'S TRUST IS THEREBY IMPROVED. A STEPWISE INTRODUCTION CAN PROVIDE THE EASE OF USE AND ROBUSTNESS COMPATIBILITY. A SYSTEM ADJUSTMENT CAN BE MADE ACCORDING TO THE CHANGE OF A BUSINESS PROCESS BASED ON THE TEST INTRODUCTION RESULTS OBTAINED FROM A SMALL-SCALE WHEREBY AN OPTIMUM INFORMATION SHARING ENVIRONMENT CAN BE CONSTRUCTED. AS A RESULT, A WORK STYLE HAVING BOTH EASE OF USE AND SECURITY CAN BE ESTABLISHED.

DOCUMENT IMAGE LAYOUT APPARATUS

BACKGROUND OF THE INVENTION

1. Field of the Invention

The present invention relates to a document image layout apparatus that respectively arranges print data on a data arrangement area.

2. Description of the Related Art

Conventionally, drawing elements such as graphics and character strings are arranged at a predetermined position on a page in accordance with a template. As used herein, the term "page" refers to a limited area such as A4 paper on which non-text data such as graphics or tables and text such as character strings are arranged.

As conventional page layout techniques, for example, an area on which an image is arranged is segmented into several areas on the paper surface so as to assign an article to these areas (e.g., see Japanese Patent Laid-Open No. 9-146949). A technique for cutting out an image for rearrangement is also known (e.g., see Japanese Patent Laid-Open No. 5-153371).

However, the size of the data arrangement area on which print data is arranged is fixed, whereas the size of print data with respect to the data arrangement area is not constant. Consequently, print data may protrude from the data arrangement area.

For example, assume the case where the original document is scanned by a scanner, data (image data) that has been cut out from the scanned data is arranged in the data arrangement area as the print data so as to make a print thereof. In this case, when the print data protrudes from the data arrangement area, it may require that the size of the print data is reduced in print data units or page units.

However, since there are various sizes of the print data with respect to the data arrangement area, the readability of print data, in particular, print data relating to a text attribute, is significantly reduced due to excessive reduction as shown in FIG. 35.

Also, although the size of the data arrangement area is constant, unwanted margin is undesirably increased due to the reduction in the size of the print data.

In the technique disclosed in Japanese Patent Laid-Open No. 9-146949, a plurality of patterns of the areas on which images are arranged is generated, and the images are then arranged in the respective areas so as to evaluate the patterns, which may require a considerable amount of time for processing. In addition, unwanted margin may occur depending on the pattern of the data arrangement area.

In the technique disclosed in Japanese Patent Laid-Open No. 5-153371, a predetermined segment is recognized, and article data having various shapes and sizes is synthesized, relying on the segment used for an image cutout. In this case, print data cannot be resided within the data arrangement area. Also, in this case, unwanted margin may occur within a page.

When text data that has been converted into a character code by performing character recognition such as OCR is arranged in the template TP, loss of information may occur due to false recognition and language (e.g., Japanese, English) dependency.

SUMMARY OF THE INVENTION

An aspect of the present invention is an apparatus, including a template having a plurality of data arrangement areas for identifying an arrangement position of print data, that respectively arranges a plurality of print data in a data arrangement area and makes a print. The apparatus includes a protrusion determination unit that determines a protrusion of the print data with respect to the data arrangement area, an attribute determination unit that determines whether an attribute of the print data is text or non-text, a segmentation unit that segments text data into a plurality of block data which can be arranged on at least two or more of data arrangement areas adjacent to each other when the print data is text data and protrudes from the data arrangement area, and an arrangement order determination unit that determines an arrangement order of the plurality of block data after segmentation processing with respect to the plurality of data arrangement areas based on the arrangement order of text data prior to segmentation processing.

Further features of the present invention will become apparent from the following description of exemplary embodiments with reference to the attached drawings.

BRIEF DESCRIPTION OF THE DRAWINGS

FIG. 10 is an explanatory view showing an exemplary template table.

FIGS. 11A to 11D are explanatory views showing an exemplary article data, which have been cut out from scanned data, according to the first embodiment of the present invention.

FIG. 12 is an explanatory view showing an example of area segmentation processing according to the first embodiment of the present invention.

FIGS. 14A and 14B are exemplary article information table and arrangement position information table, respectively, according to the first embodiment of the present invention.

FIGS. 16A to 16D are explanatory views showing an example of block segmentation processing according to the first embodiment of the present invention.

FIGS. 22A to 22C are explanatory views showing an exemplary article information table and arrangement position information table according to the second embodiment of the present invention.

FIG. 25 is an explanatory view showing an exemplary background table according to the third embodiment of the present invention.

FIGS. 31A and 31B are explanatory views showing an exemplary article information table and arrangement position information table, respectively, according to the fourth embodiment of the present invention.

FIGS. 32A and 32B are explanatory views showing an exemplary article information table and arrangement position information table after being upgraded, respectively, according to the fourth embodiment of the present invention.

FIG. 33 is an exemplary page layout after being subjected to block integration processing according to the fourth embodiment of the present invention.

DESCRIPTION OF THE EMBODIMENTS

Hereinafter, embodiments of the present invention will now be described with reference to the accompanying drawings.

Figure 1:
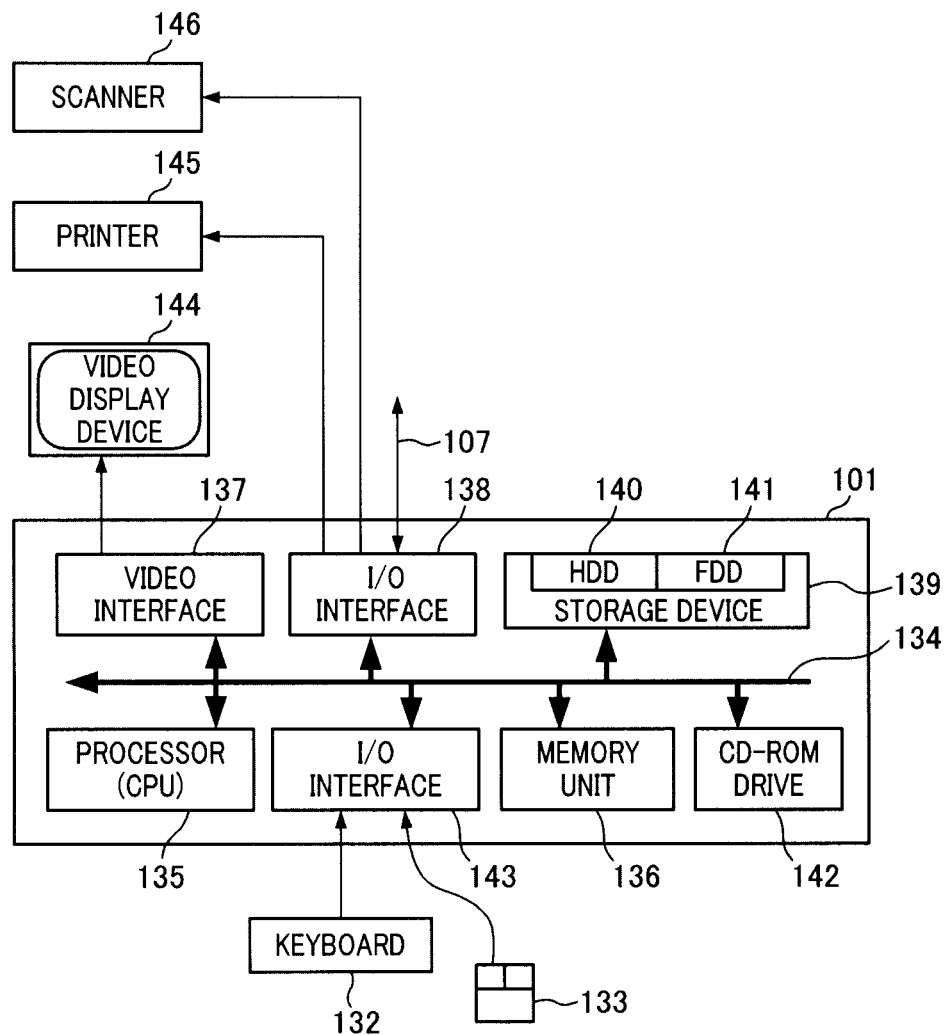
FIG. 1 is a system chart showing a document image layout apparatus according to the first embodiment of the present invention.

A first embodiment is described as follows. FIG. 1 shows a layout apparatus according to an embodiment of the present invention. The layout apparatus includes a computer 101 that executes the editing and layout of an image.

The computer 101 includes a processor unit (hereinafter referred to as "CPU") 135 that executes control such as computation, determination, and the like. The computer 101 further includes a memory unit 136 consisting of a random access memory (RAM) and a read only memory (ROM), an I/O interface 138 including a video interface 137, and a storage device 139 for storing data.

In addition, the computer 101 is provided with a CD-ROM drive 142 as a non-volatile data source.

The computer 101 utilizes an I/O interface 143 from a component (not shown) that performs communication through an operating system such as LINUX or Microsoft Windows which is registered in U.S. Patent and Trademark Office and an interconnection bus 134.

To the computer 101, an input device such as a keyboard 132 and a pointing device such as a mouse 133, a video display device 144 for displaying an image, a printer 145 for printing, and a scanner 146 as a readout device are connected.

To the I/O interface 138, another computer can be connected via a network connection 107. Typical examples of the network connection 107 include a local area network (LAN) or a wide area network (WAN).

The storage device 139 typically consists of a hard disk drive 140 and a flexible disk drive 141. The storage device 139 may also consist of a magnetic tape drive.

A computer 101 functions as a document image layout apparatus according to the present embodiment using a layout editing program in addition to operation software (OS) that is stored in the storage device 139 such as the hard disk drive 140.

The layout processing program causes the hardware resources of the computer 101 to function as the document image layout apparatus that includes a protrusion determination unit, an attribute determination unit, a segmentation unit, and an arrangement order determination unit to be described below. In the present embodiment, the protrusion determination unit, the segmentation unit, and the arrangement order determination unit are integrated as a layout editing unit.

Figure 2:
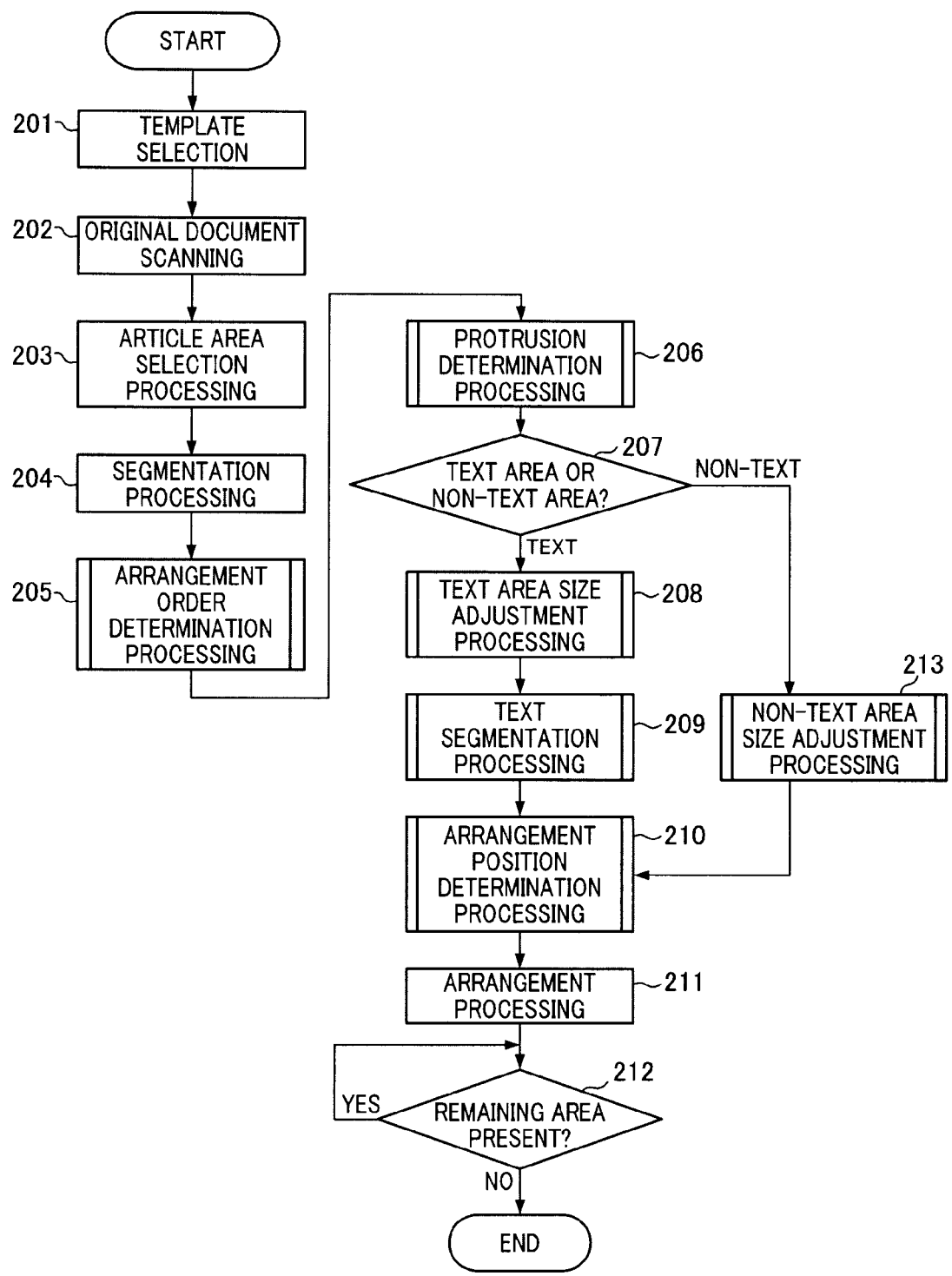
FIG. 2 is a main flowchart showing a layout processing program according to the first embodiment of the present invention.

FIG. 2 is a flowchart showing the control content of the layout processing program. The layout editing program, when activated, issues selection instructions about the selection of the template TP via the I/O interface 143 to the layout editing unit. Note that computation, comparison, and control at the layout editing unit are executed by the CPU 135 and the hardware of the computer 101 associated therewith.

As shown in FIG. 2, when the layout editing unit receives selection instructions about the template TP, it selects the template TP corresponding to the size of printing paper from the group of templates, which are stored on the storage device 139, based on the size of printing paper. The layout editing unit develops a template table in the memory unit 136 based on the selected template TP (step 201).

Figure 6:
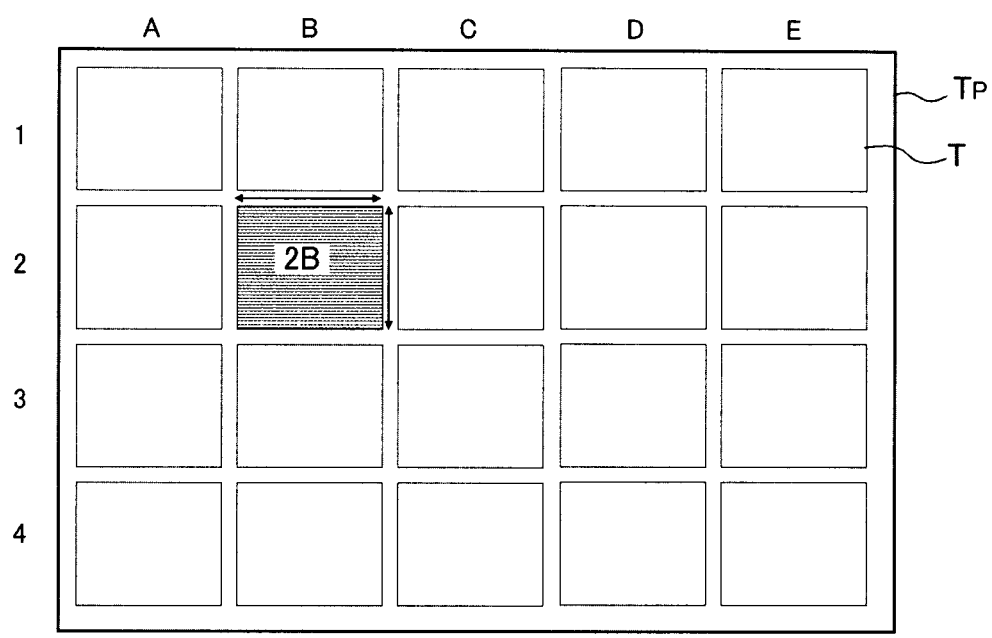
FIG. 6 is an explanatory view showing an exemplary template.
Figure 10:
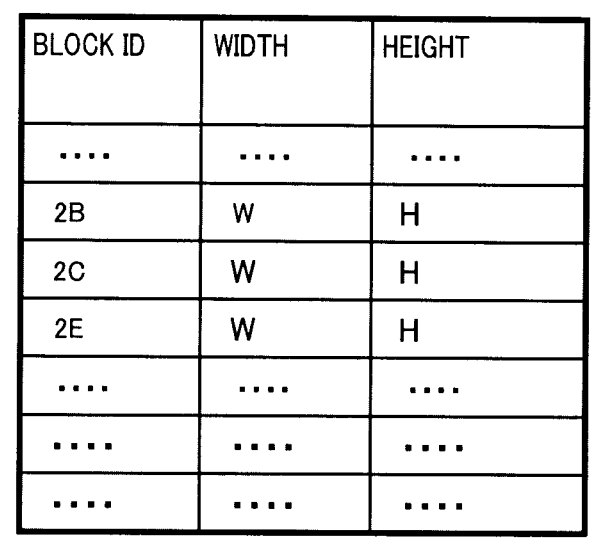

FIG. 6 shows a template TP that has been selected in step 201. FIG. 10 shows an exemplary template table. As shown in FIG. 6, a plurality of data arrangement areas T is mutually adjacently arranged in multiple rows and multiple stages on the template TP so as to arrange the print data.

As shown in FIG. 10, the template table includes the width, height, and allocation position of the data arrangement area T for the template TP. The allocation position is generated by the combination of the address in the width direction (A, B, ...) and the address in the height direction (1, 2, 3, ...) of the template TP.

Referring back to FIG. 2, in step 5202, the layout editing unit transmits scan instructions to the scanner 146 via the I/O interface 143, and scanned data is transmitted from the scanner 146 to the layout editing unit. The layout editing unit, when a scan signal has been received, stores it on the storage device 139, e.g., the hard disk drive 140 as print data with respect to a printing paper. Also, the received scanned data is transmitted to the video display device 144 so as to be displayed on the screen (original document scanning processing).

Next, the layout editing unit issues cut-out instructions about the scanned data, cuts out data from the scanned data in accordance with the cut-out instructions, and stores it on the memory unit 136 as print data (step 203, article data selection processing). Hereinafter, print data that has been cut off from scanned data is particularly referred to as "article data".

Each of FIGS. 11A to 11D shows an example of article data cut off from scanned data. As shown in FIGS. 11A to 11D, there are two kinds of article data; article data 1101 and 1103 including text data and non-text data and article data 1102 and 1104 including only text data. Article data including only non-text data may, of course, be included. In addition, the article data 1102 and 1104 are grouped into two kinds: vertical writing and horizontal writing.

The layout editing unit first functions as a segmentation unit, and performs area segmentation processing in which article data is segmented based on the text and non-text attributes (step 204, area segmentation processing).

Hereinafter, text data and non-text data that have been obtained by area segmentation are referred to as "text article data" and "non-text article data", respectively, in order to distinguish them from other article data that does not need area segmentation.

FIG. 12 shows an example where the article data 1101 is segmented into the text article data 1201 and the non-text article data 1202. When step 204 is completed, the layout editing unit functions as an arrangement order determination unit. The layout editing unit determines the arrangement order of the text article data 1201 and the non-text article data 1202 with respect to the adjacent data arrangement area T based on the arrangement order within the article data prior to segmentation (step 205, arrangement order determination processing).

Figure 3:
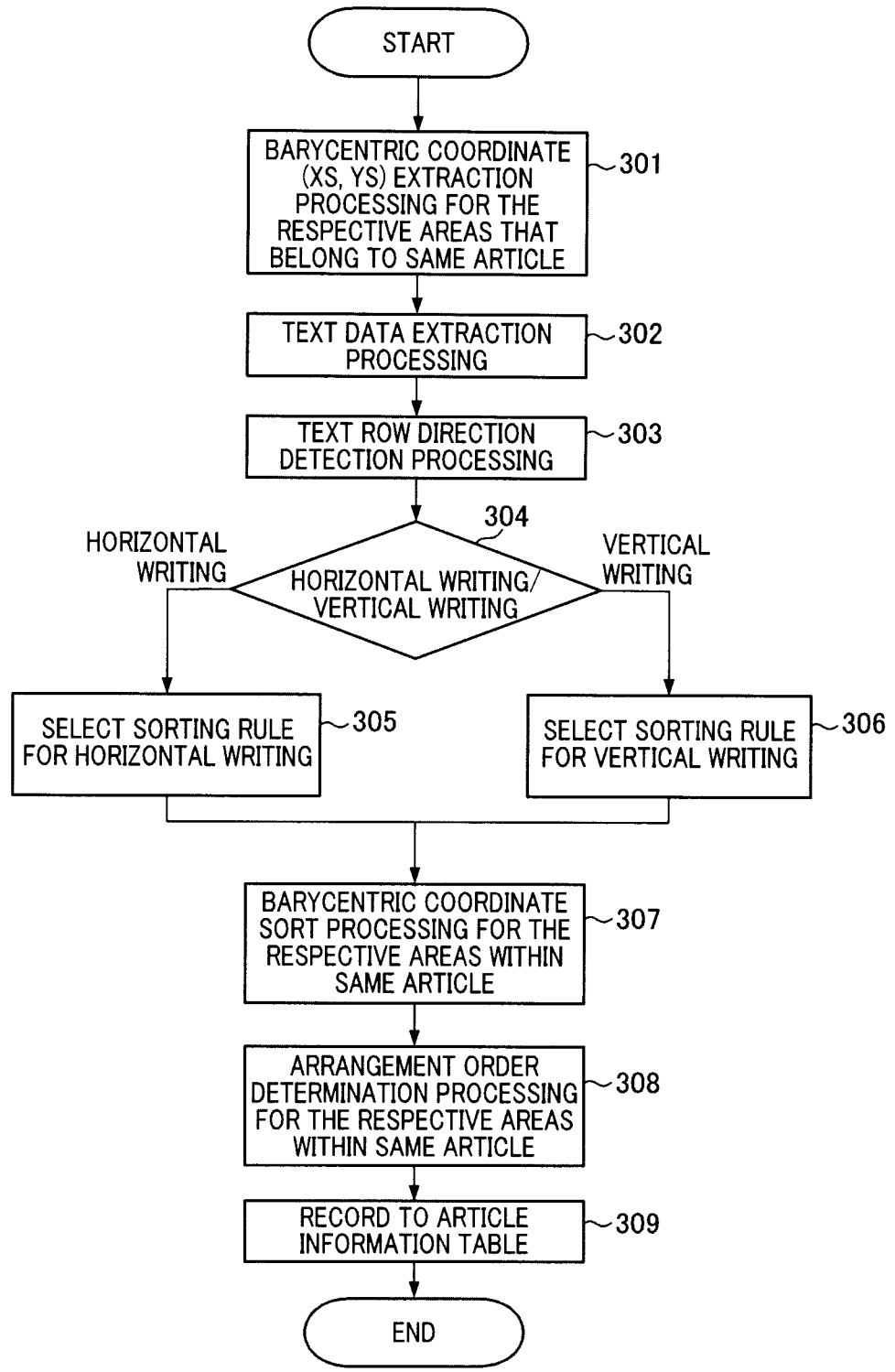
FIG. 3 is a flowchart showing arrangement order determination processing of the layout processing program according to the first embodiment of the present invention.

FIG. 3 is a flowchart showing an example of arrangement order determination processing to be performed in step 205.

Figure 13:
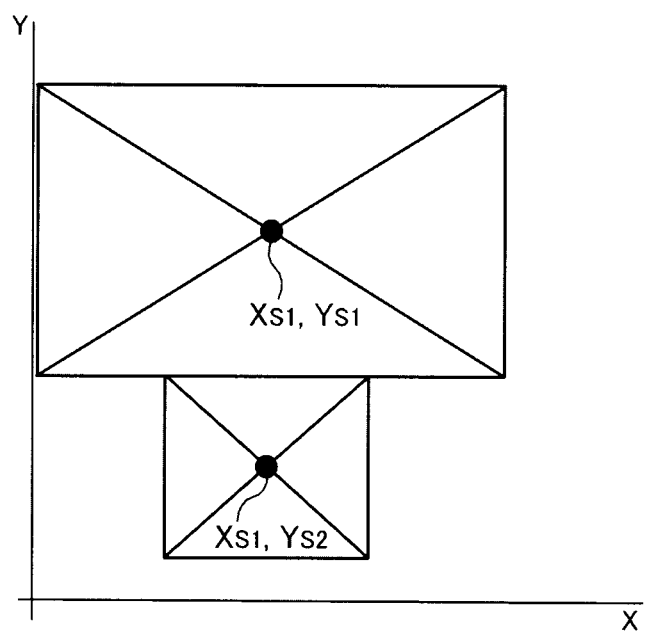
FIG. 13 is an explanatory view showing an exemplary barycentric coordinate extraction according to the first embodiment of the present invention.

First, the layout editing unit determines the arrangement order of the text article data 1201 and the non-text article data 1202 after segmentation processing in step 204. In order to determine the arrangement order, a layout editing unit, as shown in FIG. 13, extracts the barycentric coordinates (Xs1, Ys1), (Xs1, Ys2) of the text article data 1201 and the non-text article data 1202 (step 301, barycentric coordinate extraction processing).

Next, the layout editing unit extracts the text data from the text article data 1201 that has been obtained by segmentation processing (step 302, text data extraction processing).

Next, the layout editing unit detects the text row direction of the text data that has been extracted in step 302 (step 303, text direction detection processing).

Next, the layout editing unit determines whether the text row direction of the text article data 1201 is vertical writing or horizontal writing (step 304).

In step 304, when the text article data 1201 is horizontal writing, the layout editing unit functions as a sorting rule selection unit, and selects the sorting rule for horizontal writing, which has previously stored on the memory unit 136 (step 305).

In the present embodiment, the following rules are adopted as the sorting rules for horizontal writing.

(1) In the case of horizontal writing, the area with the x-coordinate of its barycenter being on the left is prioritized.

(2) When the x-coordinate of its barycenter lies in the same position, the area with the y-coordinate of its barycenter being on the top is prioritized.

In step 304, even when the text area is vertical writing, the layout editing unit functions as a sorting rule selection unit, and selects the sorting rule for vertical writing, which has previously stored in the memory unit 136 (step 306).

In the present embodiment, the following rules are adopted for the sorting rule for vertical writing.

(1) In the case of vertical writing, the area with the x-coordinate of its barycenter being on the right is prioritized.

(2) When the x-coordinate of its barycenter lies in the same position, the area with the y-coordinate of its barycenter being on the top is prioritized.

Next, the layout editing unit sorts the barycentric coordinates for each area with the selected sorting rule (step 307, sort processing).

The layout editing unit functions as an in-printed data arrangement order determination unit. In other words, the layout editing unit determines the arrangement order of the text article data 1201 and the non-text article data 1202, which belong to the article data prior to segmentation processing, based on the sorted results (step 308, arrangement order determination processing).

Subsequently, the layout editing unit functions as a recording unit. The layout editing unit stores the article ID, segmented area ID, data attribute, and the like for each area of each data (e.g., data 1201 and 1202) in an article information table 1401 in accordance with the arrangement order that has been determined in step 308, as shown in FIG. 14A (step 309).

Next, the layout editing unit functions as a protrusion detection unit. The layout editing unit determines the presence or absence of the protrusion of the text article data 1201 and the non-text article data 1202, which have been obtained by segmentation processing, with respect to the size of the data arrangement area T of the template table (see FIG. 10) (step 206, protrusion determination processing).

Figure 4:
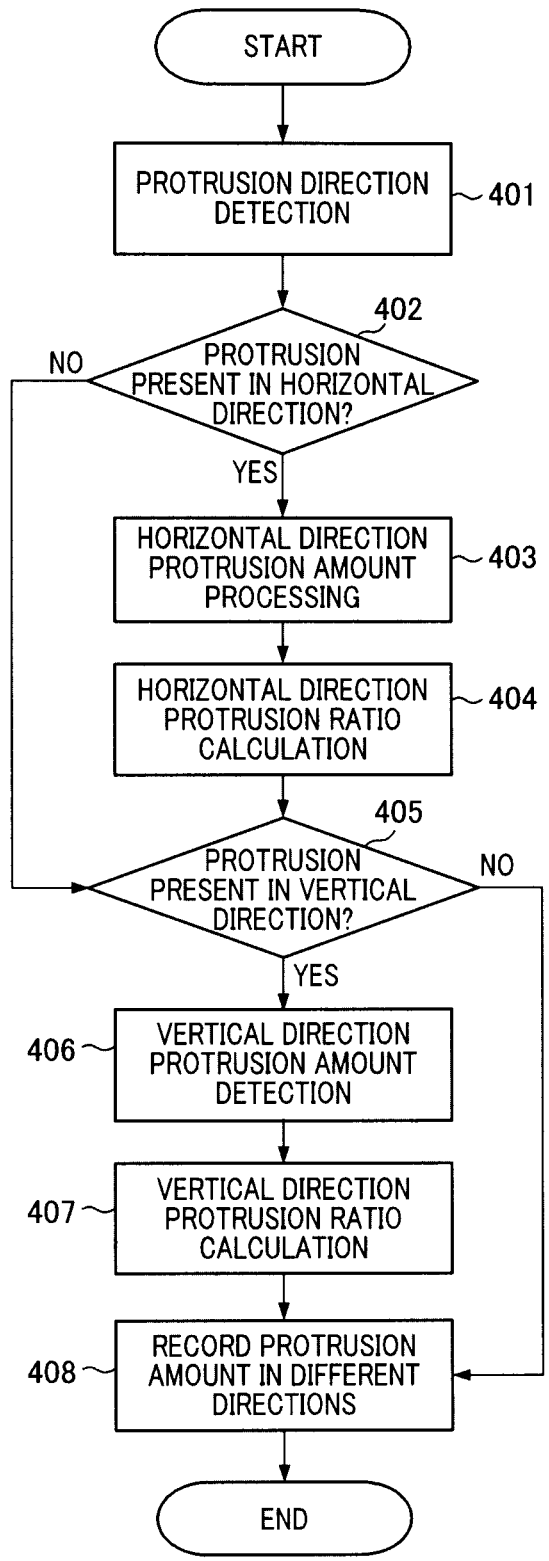
FIG. 4 is a flowchart showing protrusion detection processing of the layout processing program according to the first embodiment of the present invention.

FIG. 4 is a flowchart showing an example of protrusion detection processing in step 206.

First, the layout editing unit sequentially refers to the text article data 1201 and the non-text article data 1202, and detects the respective directions protruding from the data arrangement area T (step 401, protrusion direction detection processing).

Figure 15:
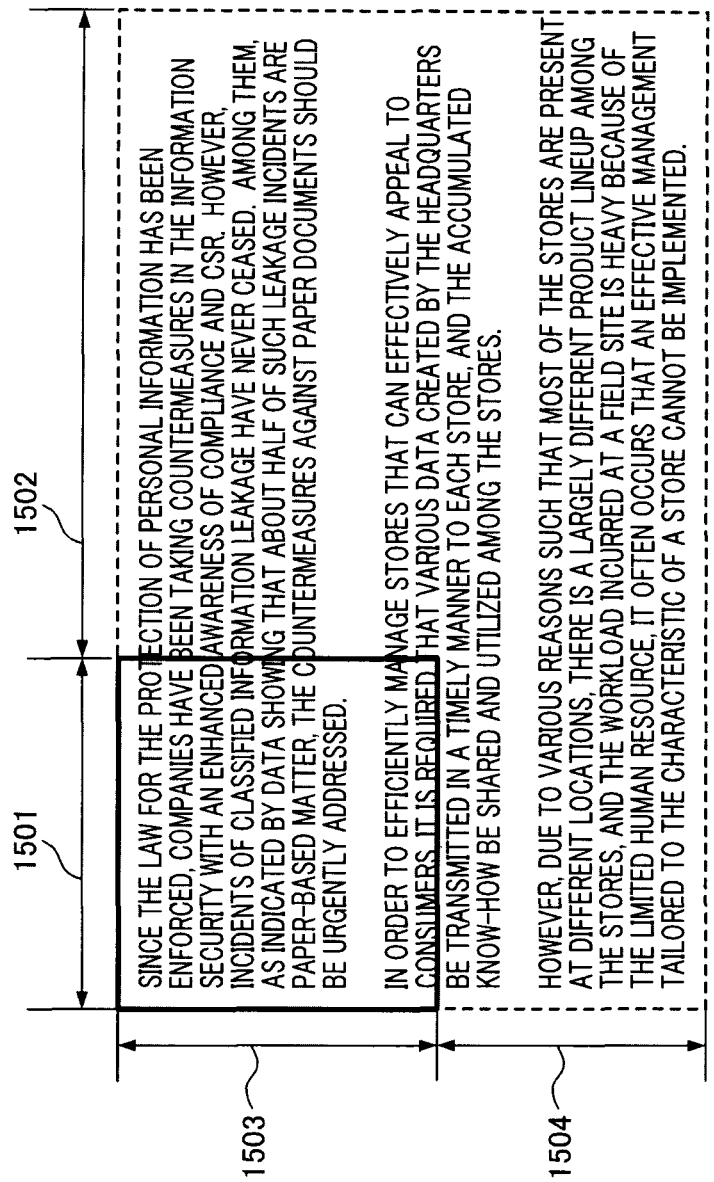
FIG. 15 is an explanatory view showing an exemplary protrusion detection according to the first embodiment of the present invention.

Next, the layout editing unit functions as a horizontal direction protrusion determination unit. As shown in FIG. 15, the layout editing unit determines whether or not the text article data 1201 and the non-text article data 1202 protrude in the horizontal direction with respect to the size 1501 in the horizontal direction of the data arrangement area T (step 402).

In step 402, when the text article data 1201 and the non-text article data 1202 protrude from the data arrangement area T in the horizontal direction, the layout editing unit further calculates the amount of protrusion (n) (1502 in FIG. 15) in the horizontal direction (step 403). In step 403, the layout editing unit functions as a horizontal direction protrusion amount detection unit.

Next, the layout editing unit functions as a horizontal direction protrusion ratio calculation unit configured to calculate the protrusion ratio in the horizontal direction, and calculates the horizontal direction protrusion ratio (Dn) from the calculated amount of protrusion (n) in the horizontal direction (step 404).

The following Formulae (1) to (3) are formulae for calculating the horizontal direction protrusion ratio (Dn).

The width of the data arrangement area (1501 in FIG. 15)=W Formula (1)

The horizontal direction protrusion amount (1502 in FIG. 15)=n Formula (2)

The horizontal direction protrusion ratio Dn=(W+n)/W Formula (3)

Next, the layout editing unit functions as a vertical direction protrusion determination unit, and checks whether or not the text article data 1201 and the non-text article data 1202 protrude in the vertical direction with respect to the size of the data arrangement area T in the vertical direction (step 405).

In step 405, when the text article data 1201 and the non-text article data 1202 protrude in the vertical direction with respect to the size 1503 in the vertical direction of the data arrangement area T, the layout editing unit functions as a vertical direction protrusion amount detection unit. Then, the layout editing unit functions as a vertical direction protrusion ratio calculation unit, and detects the amount of protrusion (m) in the vertical direction of the text article data 1201 and the non-text article data 1202 (step 406).

The vertical direction protrusion ratio (Dm) is calculated from the detected vertical direction protrusion amount (m) (step 407).

The following Formulae (4) to (6) are exemplary formulae for calculating the vertical direction protrusion ratio (Dm).

The height of the data arrangement area (1503 in FIG. 15)=H Formula (4)

The vertical direction protrusion amount (1504 in FIG. 15)=m Formula (5)

The vertical direction protrusion ratio Dm=(H+m)/H Formula (6)

Next, as shown in FIG. 14A, the layout editing unit stores the obtained protrusion direction, protrusion amount, and protrusion ratio in the article information table 1401 in the memory unit 136 (step 408).

Subsequently, the layout editing unit functions as an attribute determination unit. The layout editing unit sequentially refers to the text article data 1201 and the non-text article data 1202 that have been obtained by area segmentation, and identifies, from the data attribute of the article information table 1401, whether these are text data or non-text data (step 207).

When step 207 has identified that the data attribute of the reference image is text data, the layout editing unit performs text area size adjustment processing for the text data (step 208).

Figure 8:
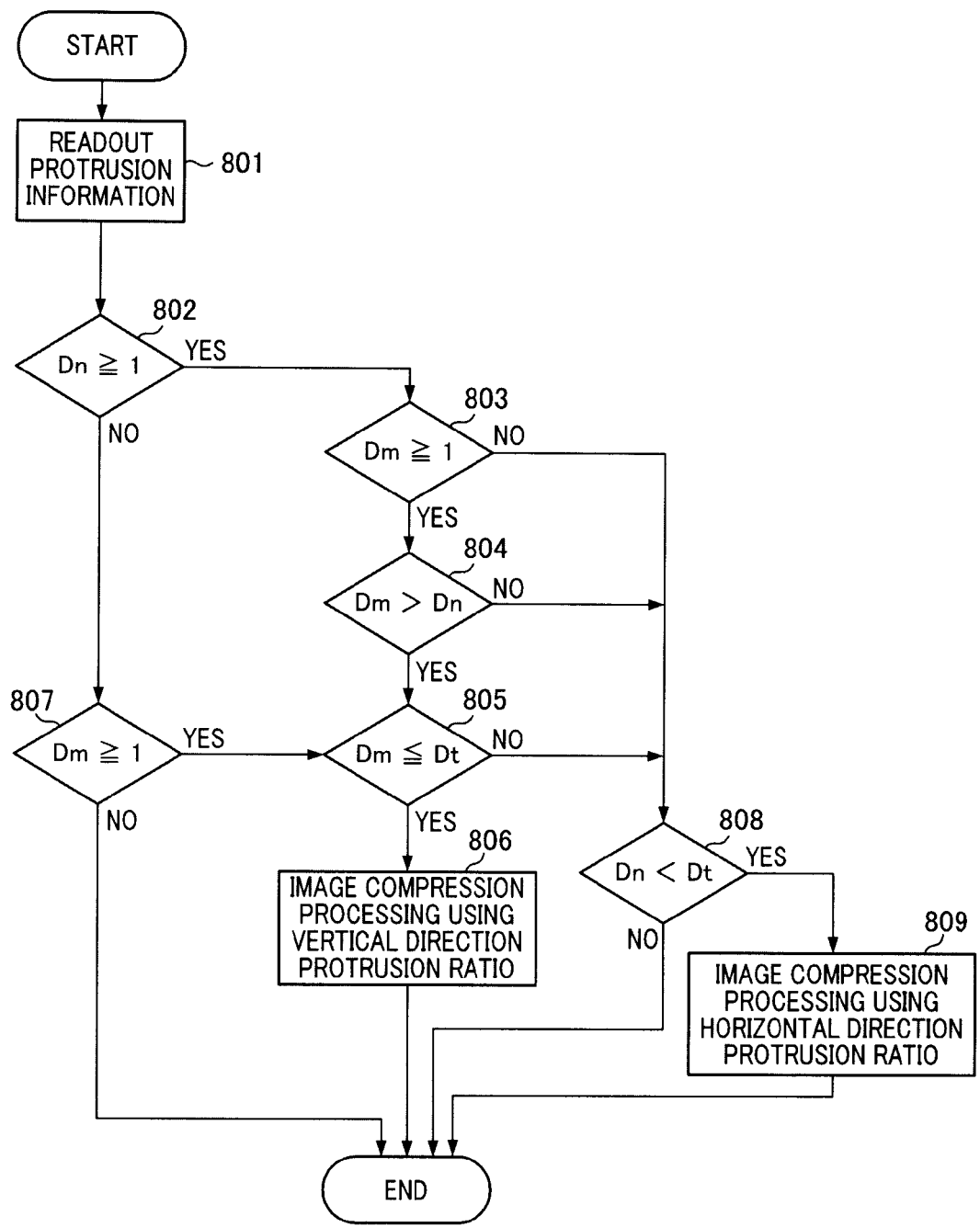
FIG. 8 is a flowchart showing text area size adjustment processing of the layout processing program according to the first embodiment of the present invention.

FIG. 8 is a flowchart showing an example of text area size adjustment processing in step 208. The flowchart will also be described with reference to FIGS. 12 and 14A.

First, in the readout processing 801, the layout editing unit refers to information about the protrusion of the text article data 1201 that is currently referred to from the article information table 1401 shown in FIG. 14. Then, the layout editing unit reads out the horizontal direction protrusion ratio (Dn) and the vertical direction protrusion ratio (Dm) (step 801).

When the horizontal direction protrusion ratio (Dn) is not more than 1, it means that the referred article data is contained within the size of the data arrangement area T in the horizontal direction. Thus, in step 802, the layout editing unit checks whether or not the horizontal direction protrusion ratio (Dn) of the text article data is greater than 1.

When the result of the comparison in step 802 shows that the horizontal direction protrusion ratio (Dn) is greater than 1, the layout editing unit subsequently checks whether or not the vertical direction protrusion ratio (Dm) is greater than 1 (step 803).

When the result of the comparison in step 803 shows that the vertical direction protrusion ratio (Dm) is greater than 1, the layout editing unit compares the vertical direction protrusion ratio (Dm) with the horizontal direction protrusion ratio (Dn) (step 804).

When the result of the comparison in step 804 shows that the vertical direction protrusion ratio (Dm) is greater than the horizontal direction protrusion ratio (Dn), the layout editing unit compares the vertical direction protrusion ratio (Dm) with the threshold value (Dt) (step 805).

When the result of the comparison in step 805 shows that the vertical direction protrusion ratio (Dm) is less than or equal to the threshold value (Dt), the layout editing unit determines that the protrusion amount in the vertical direction is very small, and performs compression processing of the article data of interest by using the vertical direction protrusion ratio.

In other words, the article data of interest is compressed such that the image is contained within the reference size using the inverse of the vertical direction protrusion ratio (1/Dm) as the image compression ratio (step 806, image compression processing). When compressed under such a condition, the text article data 1201 remains substantially the same as the original, leading to no degradation of readability.

When the result of the comparison in step 803 shows that the vertical direction protrusion ratio (Dm) is not more than 1, the layout editing unit compares the horizontal direction protrusion ratio (Dn) with the threshold value (Dt) (step 808).

Likewise, when the result of the comparison in step 804 shows that the vertical direction protrusion ratio (Dm) is less than or equal to the horizontal direction protrusion ratio (Dn), the layout editing unit compares the horizontal direction protrusion ratio (Dn) with the threshold value (Dt) (step 808).

Likewise, when the result of the comparison in step 805 shows that the vertical direction protrusion ratio (Dm) is greater than or equal to the threshold value (Dt), the layout editing unit compares the horizontal direction protrusion ratio (Dn) with the threshold value (Dt) (step 808).

When the result of the comparison in step 808 shows that the horizontal direction protrusion ratio (Dn) is less than the threshold value (Dt), the layout editing unit determines that the protrusion amount in the horizontal direction is very small, and performs compression processing of the image of the area of interest by using the horizontal direction protrusion ratio (Dn).

In other words, the image of the area of interest is compressed such that the image is contained within the reference size using the inverse of the horizontal direction protrusion ratio (1/Dn) as the image compression ratio (step 809, image compression processing). Even when compressed under such a condition, the text article data 1201 remains substantially the same as the original, leading to no degradation of readability.

When the result of the comparison in step 808 shows that the horizontal direction protrusion ratio (Dn) is greater than or equal to the threshold value (Dt), the layout editing unit determines that the protrusion amount is not small and compression leads to degradation of readability. Hence, the layout editing unit exits from the text area size adjustment processing flow without performing image compression processing.

When the result of the comparison in step 802 shows that the horizontal direction protrusion ratio (Dn) is not more than 1, the layout editing unit checks whether or not the vertical direction protrusion ratio (Dm) is greater than 1 (step 807).

When the result of the comparison in step 807 shows that the vertical direction protrusion ratio (Dm) is greater than 1, the layout editing unit compares the vertical direction protrusion ratio (Dm) with the threshold value (Dt) (step 805). Steps 806 and 808, which are the processes following step 805, have been described above, and explanation thereof will be omitted.

When the result of the comparison in step 807 shows that the vertical direction protrusion ratio (Dm) is not more than 1, the layout editing unit determines that there is no protrusion, and does not perform image compression processing.

As described above, the layout editing unit performs size adjustment processing of the area of interest.

When text area size adjustment processing has completed, the layout editing unit then segments text data into a size suitable for the arrangement of the data arrangement area T (step 209).

In this example, a description is given in the case where the text article data is segmented into a plurality of block data. It is intended that such procedures also be applied to the article data consisting of text data alone.

Figure 5:
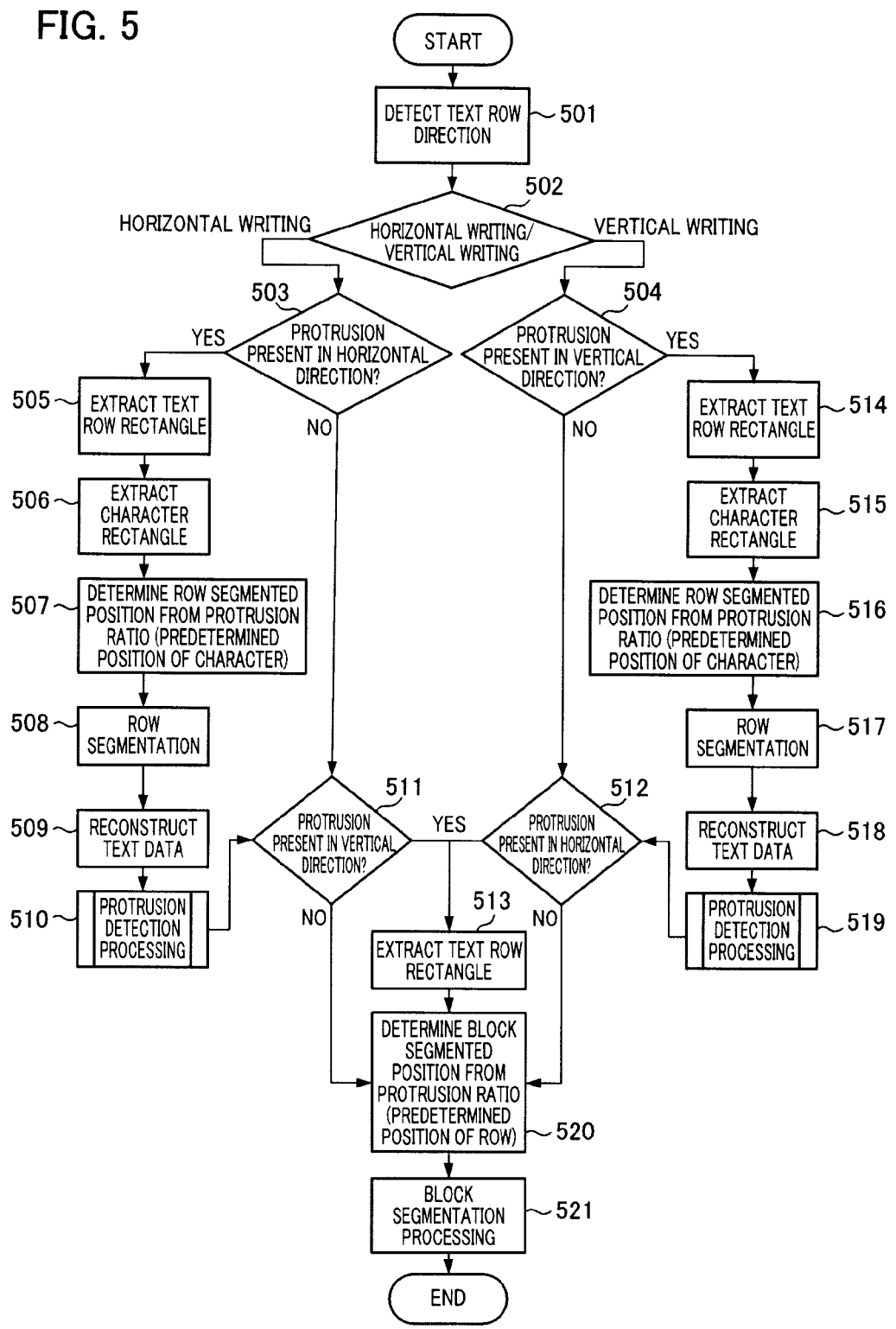
FIG. 5 is a flowchart showing block segmentation processing of the layout processing program according to the first embodiment of the present invention.

FIG. 5 shows a flowchart of block segmentation processing to be performed in step 209. The flowchart will be described with reference to FIGS. 12, 14A, 15, and 16.

First, the layout editing unit detects the text row direction about the text article data 1201 (step 501).

Next, the layout editing unit detects from the article information table 1401 (FIG. 14A) whether the text row direction of the article data of interest for block segmentation, i.e., the text article data 1201 is vertical writing or horizontal writing (step 502).

In step 502, when the text row direction of the text article data 1201 is horizontal writing, the layout editing unit checks whether or not the text article data 1201 protrudes with respect to the size 1501 (see FIG. 15) in the horizontal direction of the data arrangement area T (step 503). The determination processing is executed based on the information of the article information table 1401.

In step 503, when there is no protrusion in the horizontal direction, the layout editing unit determines whether or not the text article data 1201 protrudes in the vertical direction with respect to the size 1503 (see FIG. 15) in the vertical direction of the data arrangement area T (step 511).

In step 511, when there is a protrusion in the vertical direction, the layout editing unit functions as a text row extraction unit, and extracts a text row rectangle (step 513). By means of such processing, for example, "Since the Law for the Protection of Personal Information has been" in line 1 in FIG. 12 is extracted as the first text row rectangle. Likewise, "enforced, companies have been taking countermeasures in the information" in line 2 in FIG. 12 is extracted as the second text row rectangle. By the aforementioned processing, 16 text row rectangles are extracted from the text article data shown in FIG. 12.

In step 503, when there is a protrusion in the horizontal direction, the layout editing unit extracts the text row rectangle of interest as shown in FIG. 16A (step 505, see 1601 shown in FIG. 16A).

Figure 16B:
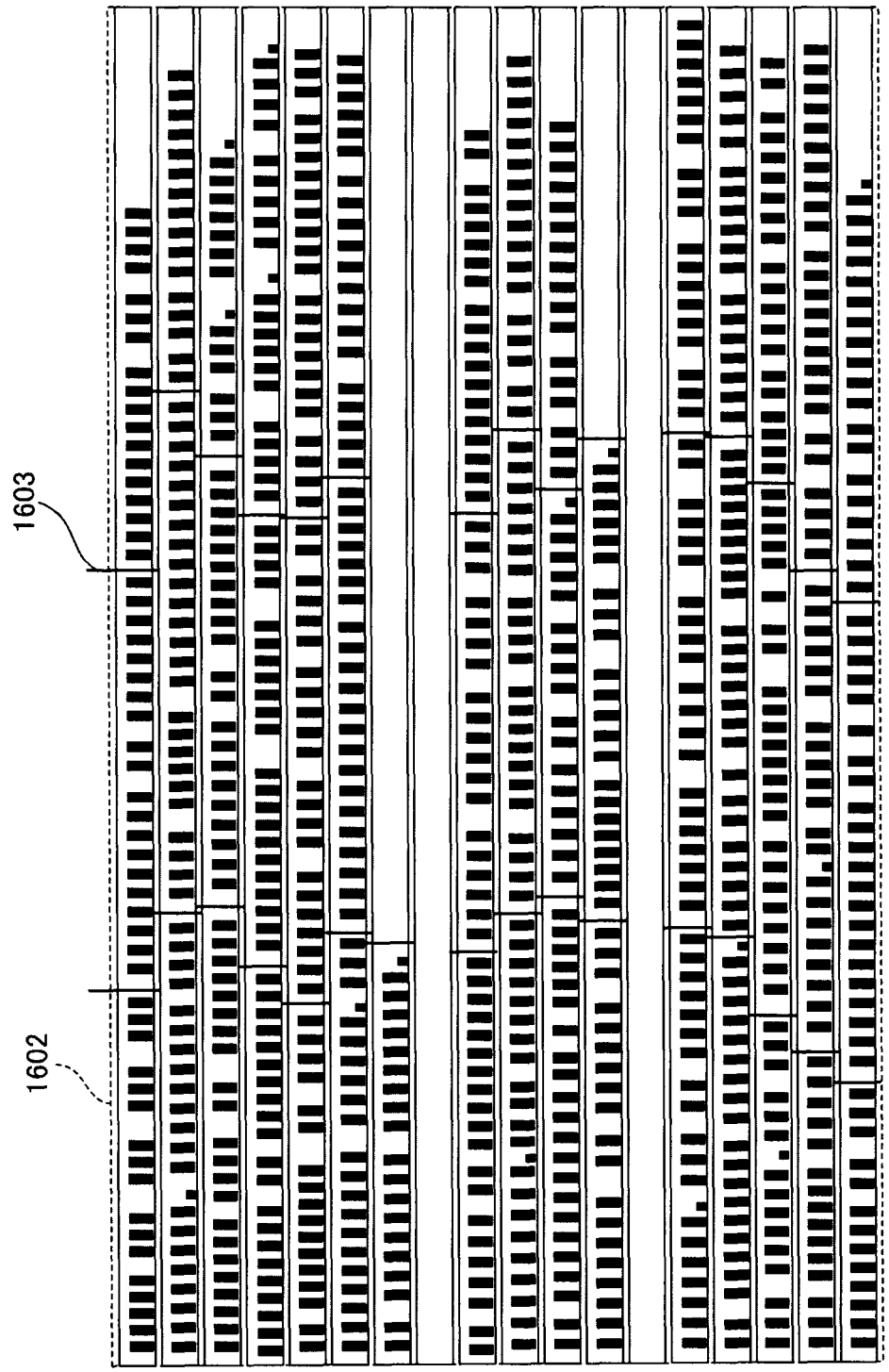

Next, the layout editing unit functions as a character rectangle extraction unit, and extracts the character rectangle 1602 of the text article data 1201 as shown in FIG. 16B (step 506). As used herein, the "character rectangle 1602" refers to a black rectangle as shown in FIG. 16B.

Next, the layout editing unit functions as a row segmentation position determination unit, and determines the row segmentation position 1603 of the text article data 1201 from the horizontal direction protrusion ratio (Dn) (step 507). When the row segmentation position is determined, the layout editing unit determines the row segmentation position while taking the position where a single character rectangle 1602 extracted in step 506 is not segmented into account.

Subsequently, the layout editing unit functions as a row segmentation unit, and the text data is segmented by row at the row segmentation position that has been determined in step 507 (step 508, see 1603 shown in FIG. 16B).

Next, the layout editing unit functions as a data reconstruction unit, and moves the segmented text row rectangle and rearranges the text data of the text article data 1201 for reconstruction (image construction) (step 509). Consequently, 1604 shown in FIG. 16C is generated.

Next, the layout editing unit performs protrusion detection processing again by the comparison between the reconstructed text article data 1604 and the 1503 shown in FIG. 15 (step 510).

Next, the layout editing unit determines whether or not the updated text article data 1604 protrudes in the vertical direction with respect to the size 1503 in the vertical direction of the data arrangement area T (step 511).

In step 511, when there is a protrusion in the vertical direction, the layout editing unit functions as a text row rectangle detection unit, and extracts a text row rectangle in the updated text article data 1201 (step 513). By means of such processing, "Since the Law for the" in FIG. 16C is extracted as a text row rectangle. Likewise, "protection of personal", and "information has been" are respectively extracted as a text row rectangle. Step 520 is executed after step 513, and the details of which will be described below.

In step 502, when the text row direction of the updated text article data is vertical writing, the layout editing unit checks whether or not the updated text article data 1201 protrudes with respect to the size of the data arrangement area T in the vertical direction (step 504).

In step 504, when there is no protrusion in the vertical direction, the layout editing unit determines whether or not the updated text article data 1201 protrudes in the horizontal direction with respect to the size 1503 in the horizontal direction of the data arrangement area T (step 512).

In step 512, when there is a protrusion in the horizontal direction, the layout editing unit functions as a text rectangle row detection unit, and extracts a text row rectangle in the updated text article data 1201 (step 513).

In step 504, when there is a protrusion in the vertical direction, the layout editing unit functions as a text row detection unit, and extracts a text row rectangle from the text article data 1201 (step 514). The term "text row rectangle" as used herein refers to "Accordingly, XXX proposes to construct a network-based", "document management environment. Under the environment,", and the like as shown in the 1102 of FIG. 11B.

Next, the layout editing unit functions as a character rectangle extraction unit, and extracts a character rectangle (step 515).

Next, the layout editing unit determines a predetermined row segmentation position from the horizontal direction protrusion ratio (Dn) (step 516).

Next, the layout editing unit segments the text article data 1201 at the determined segmentation position (step 517).

Next, the layout editing unit functions as a data reconstruction unit, and moves the segmented text row so as to reconstruct (image construct) the text article data 1201 of interest (step 518).

Next, the layout editing unit functions as a text row rectangle extraction unit, and performs protrusion detection processing again for the circumscribed rectangle of the reconstructed text article data 1201 as a new area of interest (step 519, protrusion detection processing).

Next, the layout editing unit determines whether or not the newly updated text article data protrudes in the horizontal direction with respect to the standard size of the data arrangement area T (step 512). When there is a protrusion in the vertical direction as determined in step 512, the layout editing unit extracts a text row in the new area of interest (step 513).

In step 520, the layout editing unit determines the block segmentation position at which the text article data is segmented into the block 1605 that is arrangeable on the data arrangement area T as shown in FIG. 16C. It should be noted that the block segmentation position is also determined at a position not overlapping the text row rectangle.

Next, the layout editing unit functions as a block segmentation unit, and segments the text article data 1201 into a plurality of block data 1606 at the block segmentation position as shown in FIG. 16D (step 521, block segmentation processing).

When block segmentation processing is completed, the layout editing unit determines the arrangement position of the plurality of block data 1606 with respect to the template TP (step 210).

In this example, a description has been given in the case where a plurality of block data generated from the text article data is arranged. It is intended that such procedures are also applied to the case where the article data consisting of text data alone is segmented into block data.

Figure 7:
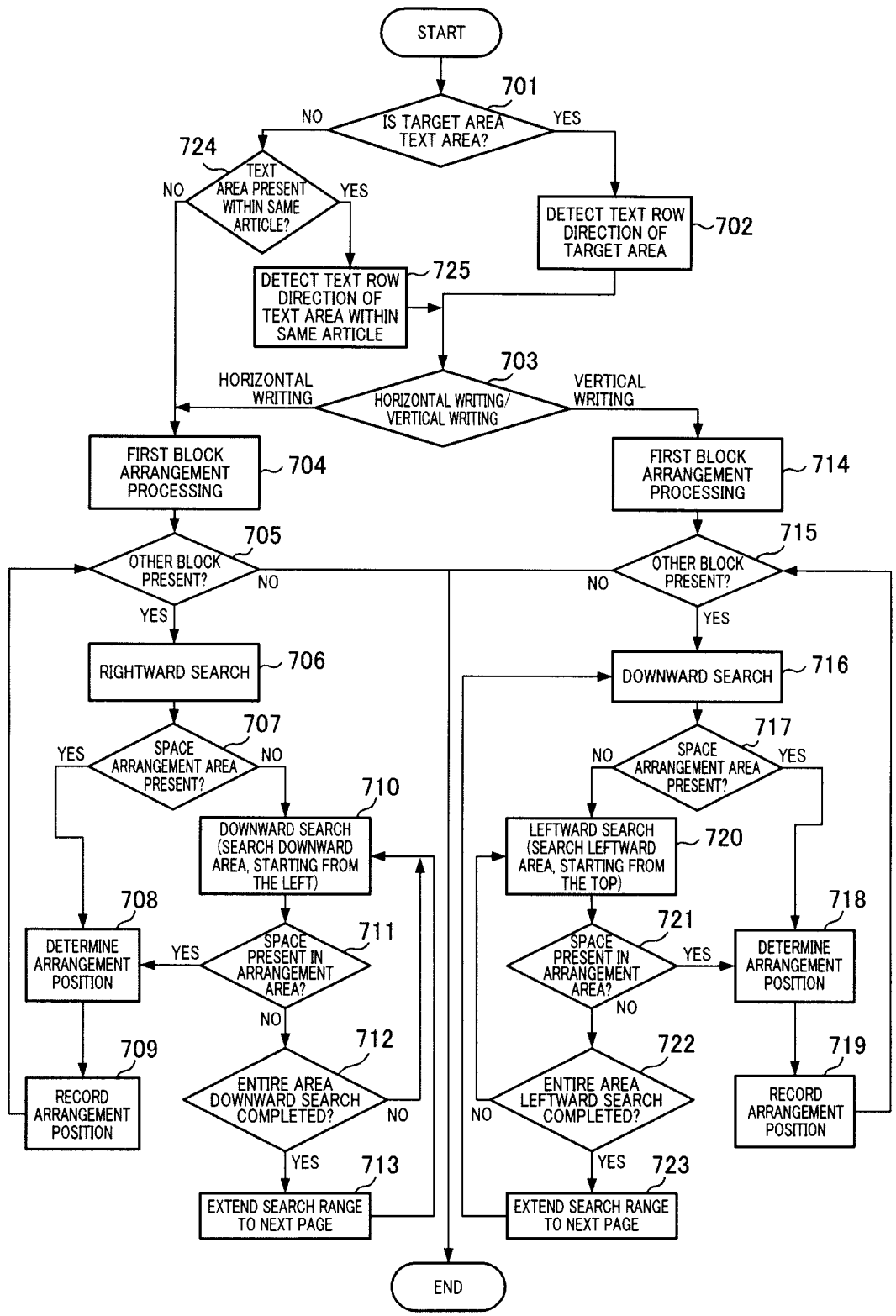
FIG. 7 is a flowchart showing arrangement position determination processing of the layout processing program according to the first embodiment of the present invention.

FIG. 7 is a flowchart showing an example of data arrangement position determination processing.

First, the layout editing unit determines from the attribute area of the article information table 1401 shown in FIG. 14 whether the article data to be arranged on the data arrangement area T is text data or non-text data (step 701).

Since the block data is generated from text data when article data is the block data, the process advances to step 702. In step 702, the layout editing unit detects the text row direction of block data, and the process advances to step 703.

In step 703, it is determined from the article information table 1401 whether the text row direction of block data is vertical writing or horizontal writing.

In step 703, when the text row direction of block data (e.g., block data 1606) is horizontal writing, the layout editing unit functions as a search unit, and searches the space in the data arrangement area T from the upper left of the template TP (see FIG. 10) to right.

Figure 17:
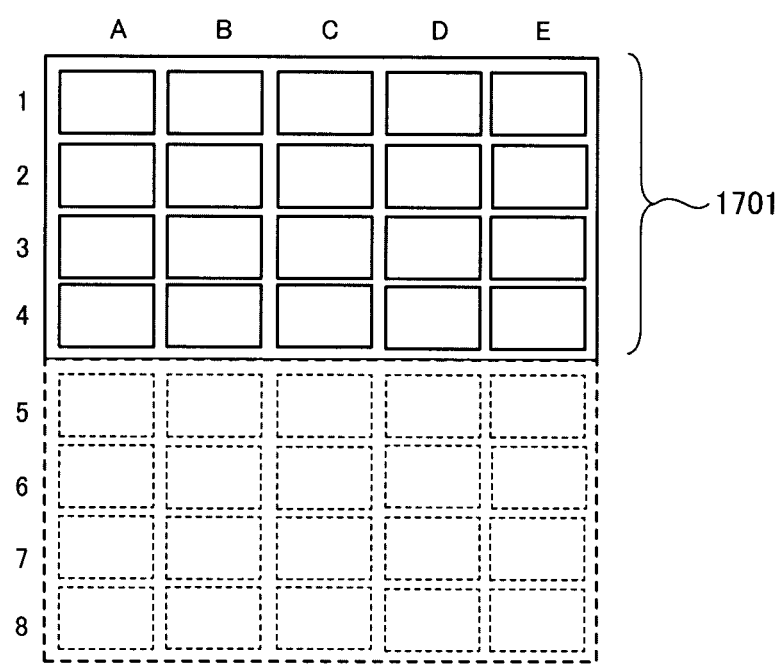
FIG. 17 is an explanatory view showing an exemplary template enlargement according to the first embodiment of the present invention.

The space in the data arrangement area T, which is obtained by the detection, is determined to be the arrangement position of the first block data (initial block data) in arrangement position determination processing as shown in FIG. 17. As shown in FIG. 14B, the layout editing unit records in the field of the in-page arrangement position symbol in an arrangement position information table 1402 (step 704).

In this example, the row address and the column address of the template TP are combined to identify the position of the block data 1606, and the position is recorded as the arrangement position in the field of the in-page arrangement position symbol in the arrangement position information table 1402.

Next, the layout editing unit checks for the presence or absence of other block data in addition to the first block within the text article data intended for the determination of the arrangement position, for example, in the text article data 1201 (step 705).

In step 705, when there is any other block data, the layout editing unit functions as a search unit, and searches the space in the data arrangement area T in the right direction on the base of the arrangement position of the first block data 1606 (step 706).

In step 707, when space is present in the data arrangement area T, the layout editing unit determines the space in the detected data arrangement area T to be the arrangement position of other block data (step 708). The layout editing unit records the arrangement position in the field of the in-page arrangement position symbol in the arrangement position information table 1402 (step 709).

When there is no space in the data arrangement area T, the layout editing unit searches the space arrangement area downward from left to right, as shown in FIG. 17, on the base of the arrangement position of the first block data 1606 on the template TP (step 710).

In step 711, when there is no space in the data arrangement area T, the layout editing unit checks whether or not the entire area has been searched to the bottom (step 712).

In step 712, when the entire area has been searched to the bottom, the layout editing unit functions as a search range extension unit, and extends the search range to the template TP on next page so as to virtually link the previous and next templates TP (step 713).

Next, in step 713, the search range is extended to the next page. In this case, the layout editing unit performs bottom searching for the virtually linked template TP (step 710).

In step 711, when space is present in the data arrangement area T, the layout editing unit determines the space in the data arrangement area T to be the arrangement position of other block data (step 708). The layout editing unit records the arrangement position in the field of the in-page arrangement position symbol in the arrangement position information table 1402 (see FIG. 14B) (step 709). When the search range is extended to the next page, the layout editing unit converts the arrangement position from the arrangement position on the virtually linked template TP into the page information and the arrangement position on a single page, and records them in the field of the in-page arrangement position symbol in the arrangement position information table 1402.

In step 703, when the text row direction of block data of interest is vertical writing, the layout editing unit searches the space in the data arrangement area T from the upper right of the template TP. The layout editing unit determines the space in the detected data arrangement area T to be the arrangement position of the first block data 1701 in the target area for the data arrangement, and records the arrangement position in the field of the in-page arrangement position symbol in the arrangement position information table 1402 (step 714).

Next, the layout editing unit checks the presence or absence of other segmented block with respect to text data to be arranged (step 715). In step 715, when there is another segmented block, the layout editing unit functions as a search unit, and searches the space in the data arrangement area T in the bottom direction on the base of the arrangement position of the first block data on the template TP (step 716).

In step 717, when space is present in the data arrangement area T, the layout editing unit determines the space in the detected data arrangement area T to be the arrangement position of other block data 1701 (step 718). The layout editing unit records the arrangement position in the field of the in-page arrangement position symbol in the arrangement position information table 1402 (step 719).

In step 717, when there is no space in the data arrangement area T of the template TP, the layout editing unit searches the left side of the space arrangement area from top to bottom on the base of the arrangement position of the first block data on the template TP (step 720).

In step 721, when space is present in the data arrangement area T, the layout editing unit determines the space in the detected data arrangement area T to be the arrangement position of other block data (step 718). The layout editing unit records the arrangement position in the field of the in-page arrangement position symbol in the arrangement position information table 1402 (step 719).

In step 721, when there is no space in the data arrangement area T, the layout editing unit checks whether the entire leftward area has been searched or not (step 722).

In step 722, when the entire leftward area has been searched, the layout editing unit functions as a search range extension unit, and extends the search range to the template TP on next page so as to virtually link the current page and next page, in other words, the forward and backward templates TP (step 723).

In step 723, when the search range is extended to the next page, the layout editing unit functions as a search range extension unit, and performs bottom searching for the virtually linked template TP (step 716).

When space is present in the data arrangement area T as a result of the extension of the search range to the next page (step 717), the layout editing unit determines the space in the data arrangement area T to be the arrangement position of other block data (step 718).

When the layout editing unit records the arrangement position in the field of the in-page arrangement position symbol in the arrangement position information table 1402, the layout editing unit converts the arrangement position on the virtually linked template TP into the number of pages and the arrangement position on a single page. The layout editing unit records them in the field of the in-page arrangement position symbol in the arrangement position information table 1402 (step 719).

Figure 34:
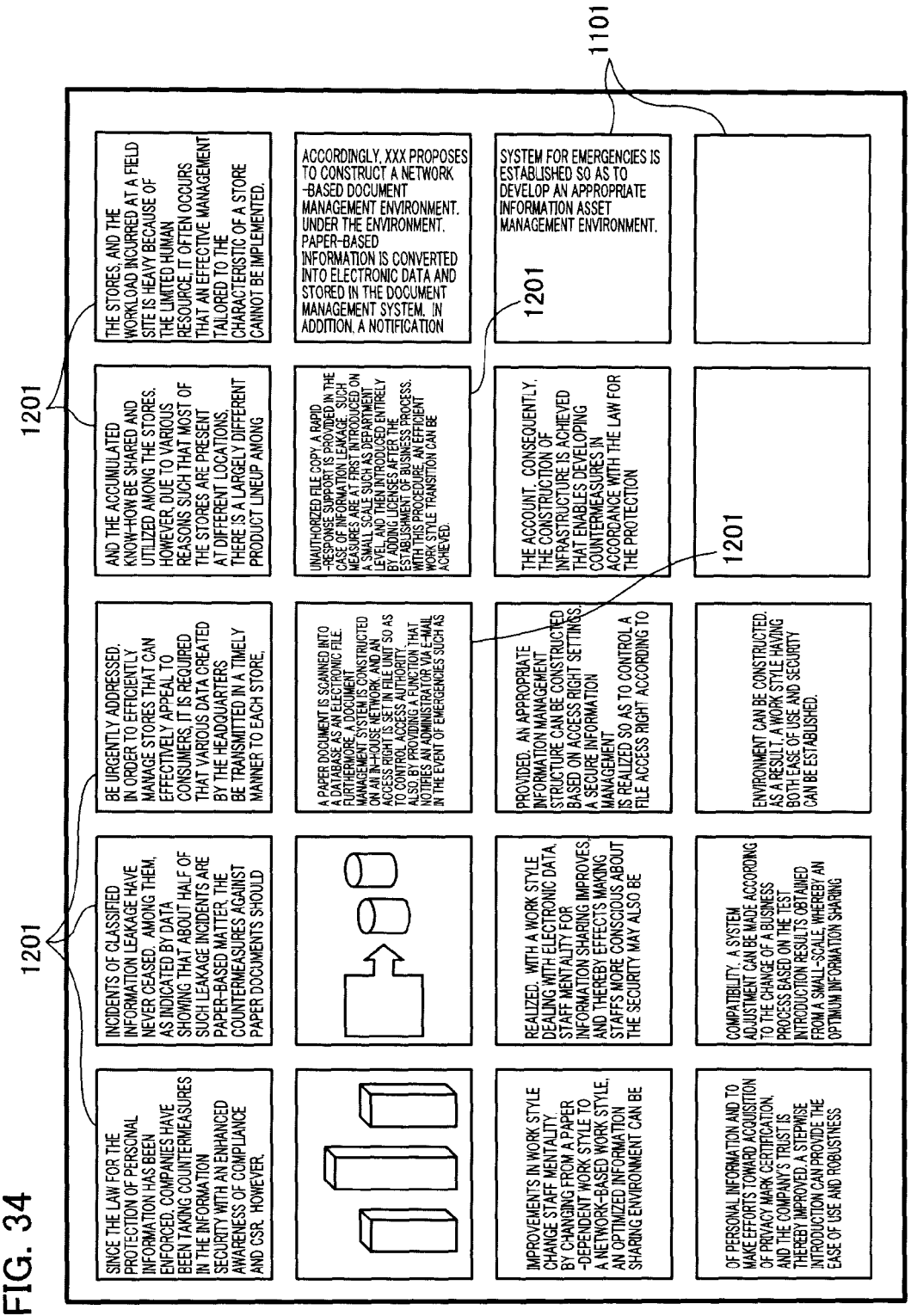
FIG. 34 is an explanatory view showing an exemplary page layout according to the fourth embodiment of the present invention.
Figure 35:
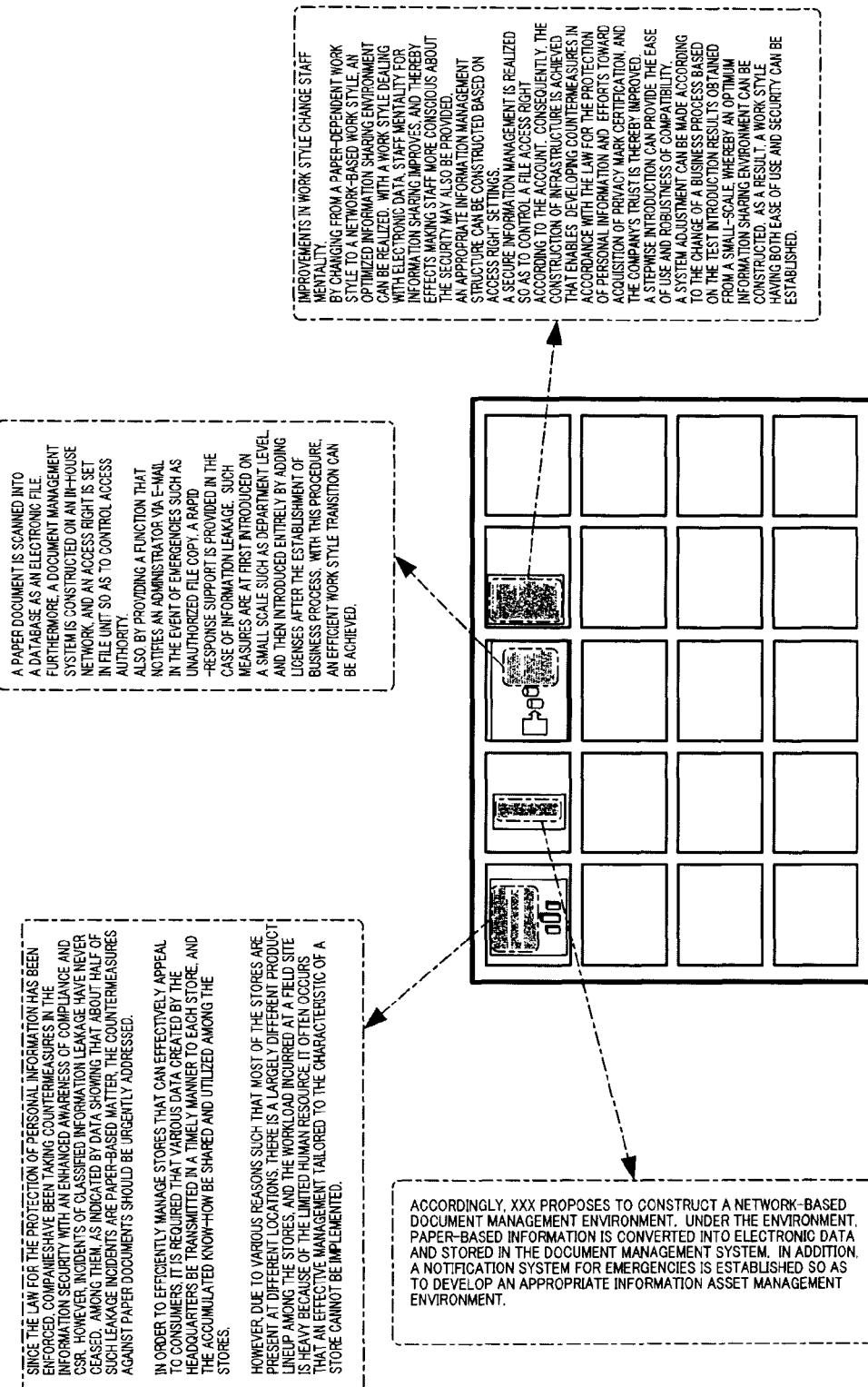
FIG. 35 is an explanatory view showing an exemplary conventional page layout.

When step 719 is completed, the layout editing unit functions as a first block arrangement processing unit. The layout editing unit arranges the first block data in the data arrangement field of the template TP, as shown in FIG. 34, in accordance with the arrangement order of the block data based on the arrangement position that has been recorded on the in-page arrangement position symbol in the arrangement position information table 1402 (FIG. 2, step 211). In other words, the block data that has been generated from the horizontal text article data is arranged in a horizontal direction, and the block data that has been generated from the vertical text article data is arranged in a vertical direction. At this time, the associated drawing is also arranged adjacent the block data of the text, and thereby reader-friendly re-layout results can be obtained.

The following Formulae (7) and (8) are conversion formulae in the case where the arrangement position on the virtually linked template TP is set to xD.

$$P = \text{(integer value of } (x-1)/4) + 1 \quad \text{Formula (7)}$$

$$Q = \text{(remainder of } (x-1)/4) + 1 \quad \text{Formula (8)}$$

Page information: page P, arrangement position on single page: QD

On other hand, when the result of the comparison in step 207 shows that the area of interest for the article data to be laid out is not text area, that is, when the area of interest is non-text article data, the layout editing unit performs non-text area size adjustment processing (step 213).

Figure 9:
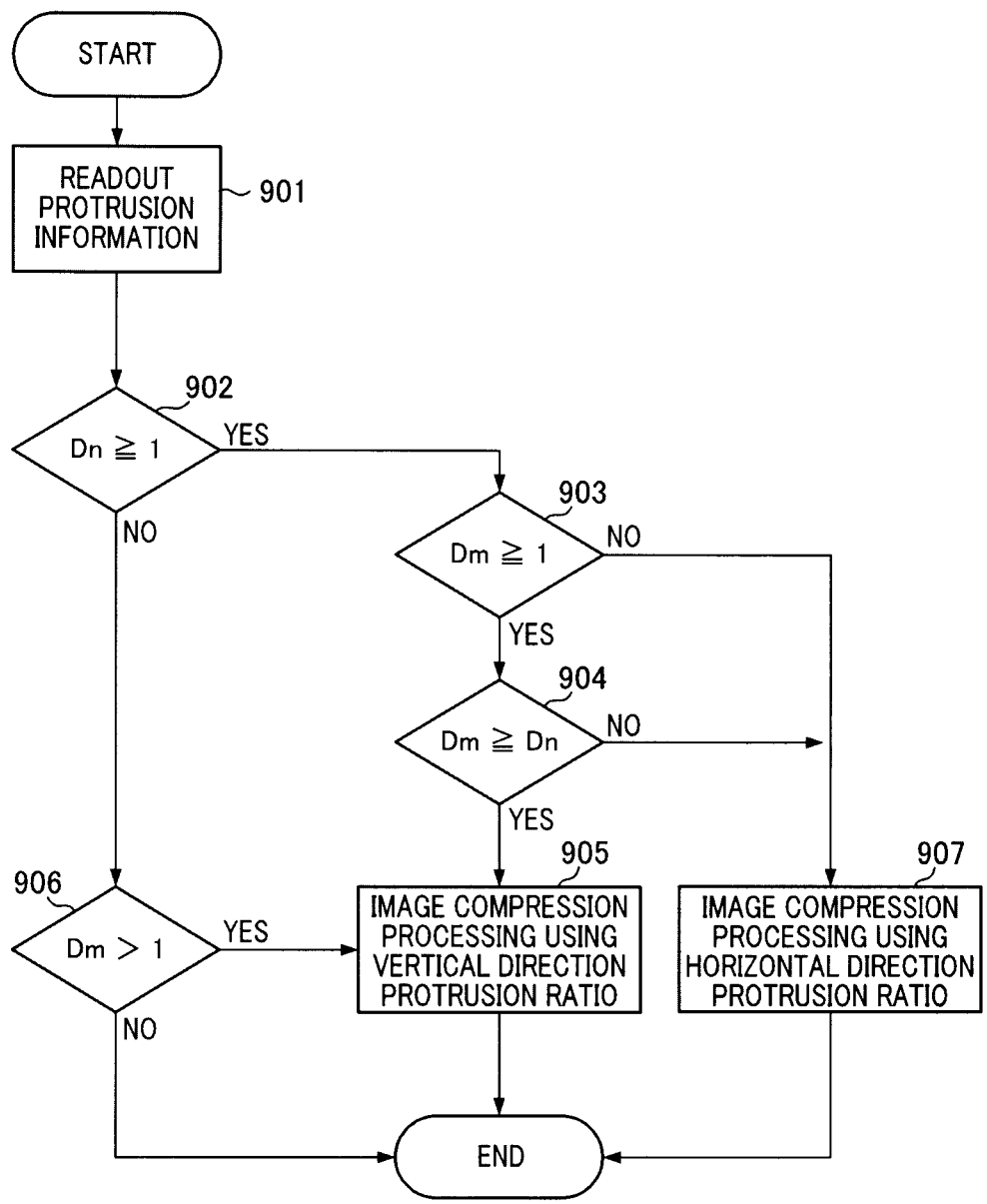
FIG. 9 is an explanatory view showing an exemplary flowchart of non-text area size adjustment processing of the layout processing program according to the first embodiment of the present invention.

FIG. 9 is a flowchart of non-text area size adjustment processing in step 213. In this example, a description is given with reference to the non-text article data 1202 shown in FIG. 12 as non-text data.

First, the layout editing unit refers to the article information table 1401 (see FIG. 14) during the protrusion information readout processing in step 901, and reads out the horizontal direction protrusion ratio (Dn) and the vertical direction protrusion ratio (Dm) of the non-text article data 1202 (step 901).

As described above, when the horizontal direction protrusion ratio (Dn) is not more than 1, the layout editing unit is contained within the size of the data arrangement area T in the horizontal direction. Hence, the layout editing unit first checks whether or not the horizontal direction protrusion ratio (Dn) is greater than 1 (step 902).

When the result of the comparison in step 902 shows that the horizontal direction protrusion ratio (Dn) is greater than 1, the layout editing unit subsequently checks whether or not the vertical direction protrusion ratio (Dm) is greater than 1 (step 903).

When the result of the comparison in step 903 shows that the vertical direction protrusion ratio (Dm) is greater than 1, the layout editing unit compares the vertical direction protrusion ratio (Dm) with the horizontal direction protrusion ratio (Dn) (step 904).

When the result of the comparison in step 904 shows that the vertical direction protrusion ratio (Dm) is greater than the horizontal direction protrusion ratio (Dn), the layout editing unit performs compression processing of the non-text article data 1202 by using the vertical direction protrusion ratio (Dm).

In other words, the non-text article data 1202 is compressed such that it is contained within the size of the data arrangement area T by using the inverse of the vertical direction protrusion ratio (1/Dm) as the compression ratio of the image data (step 905, image compression processing).

When the result of the comparison in step 903 shows that the vertical direction protrusion ratio (Dm) is not more than 1, the layout editing unit performs compression processing of the image of the area of interest by using the horizontal direction protrusion ratio (Dn) because the non-text data protrudes only in a horizontal direction.

In other words, the non-text data is compressed such that the non-text data is contained within the data arrangement area T using the inverse of the horizontal direction protrusion ratio (1/Dn) as the image compression ratio (step 907, image compression processing).

Likewise, when the result of the comparison in step 904 shows that the vertical direction protrusion ratio (Dm) is less than or equal to the horizontal direction protrusion ratio (Dn), the layout editing unit performs compression processing of the non-text article data of the area of interest by using the horizontal direction protrusion ratio (Dn).

In other words, the non-text article data is compressed such that the non-text article data 1202 is contained within the size of the data arrangement area T in the horizontal direction using the inverse of the horizontal direction protrusion ratio (1/Dn) as the image compression ratio of the non-text article data (step 907, image compression processing).

When the result of the comparison in step 902 shows that the horizontal direction protrusion ratio (Dn) is not more than 1, the layout editing unit checks whether or not the vertical direction protrusion ratio (Dm) is greater than 1 (step 906).

When the result of the comparison in step 906 shows that the vertical direction protrusion ratio (Dm) is greater than 1, the layout editing unit performs compression processing of the image of the area of interest using the vertical direction protrusion ratio (Dm).

In other words, the non-text article data is compressed such that the non-text article data 1202 is contained within the size of the data arrangement area T in the vertical direction using the inverse of the vertical direction protrusion ratio (1/Dm) as the image compression ratio (step 905).

When the result of the comparison in step 902 shows that the vertical direction protrusion ratio (Dm) is not more than 1, the layout editing unit determines that there is no protrusion either in horizontal or vertical direction, and does not perform image compression processing of the non-text article data.

As described above, the layout editing unit performs size adjustment processing of the non-text article data 1202 to be compressed.

Next, the layout editing unit determines the arrangement position of the non-text article data 1202 with respect to the template TP (step 210).

Referring to FIG. 7, the layout editing unit determines from the data attribute of the article information table 1401 whether the attribute of the article data to be arranged is text article data or non-text article data (step 701). When the article data of interest is non-text data, the process advances to step 704. Since a description has been given in the case where the article data of interest is text article data, no further description will be given here.

Since the area to be determined does not have any text area but has a non-text area when the article data is non-text data, the process advances to step 724 in this case. In step 724, it is determined whether or not the text area is present within the same article, that is, the article area. Since there is no text area when article data is non-text data, the process advances to step 704.

In step 704, as is the case with the horizontal writing, the layout editing unit functions as a search unit, and searches the space in the data arrangement area T from the upper left of the template TP.

The space in the detected data arrangement area T is determined to be the arrangement position of the first segmented block in the article data of interest, and records the arrangement position in the field of the in-page arrangement position symbol in the arrangement position information table 1402 (step 704).

The layout editing unit determines the space in the detected data arrangement area T to be the arrangement position of the first segmented block in the article data of interest, and records the arrangement position in the field of the in-page arrangement position symbol in the arrangement position information table 1402 (step 704).

Figure 18:
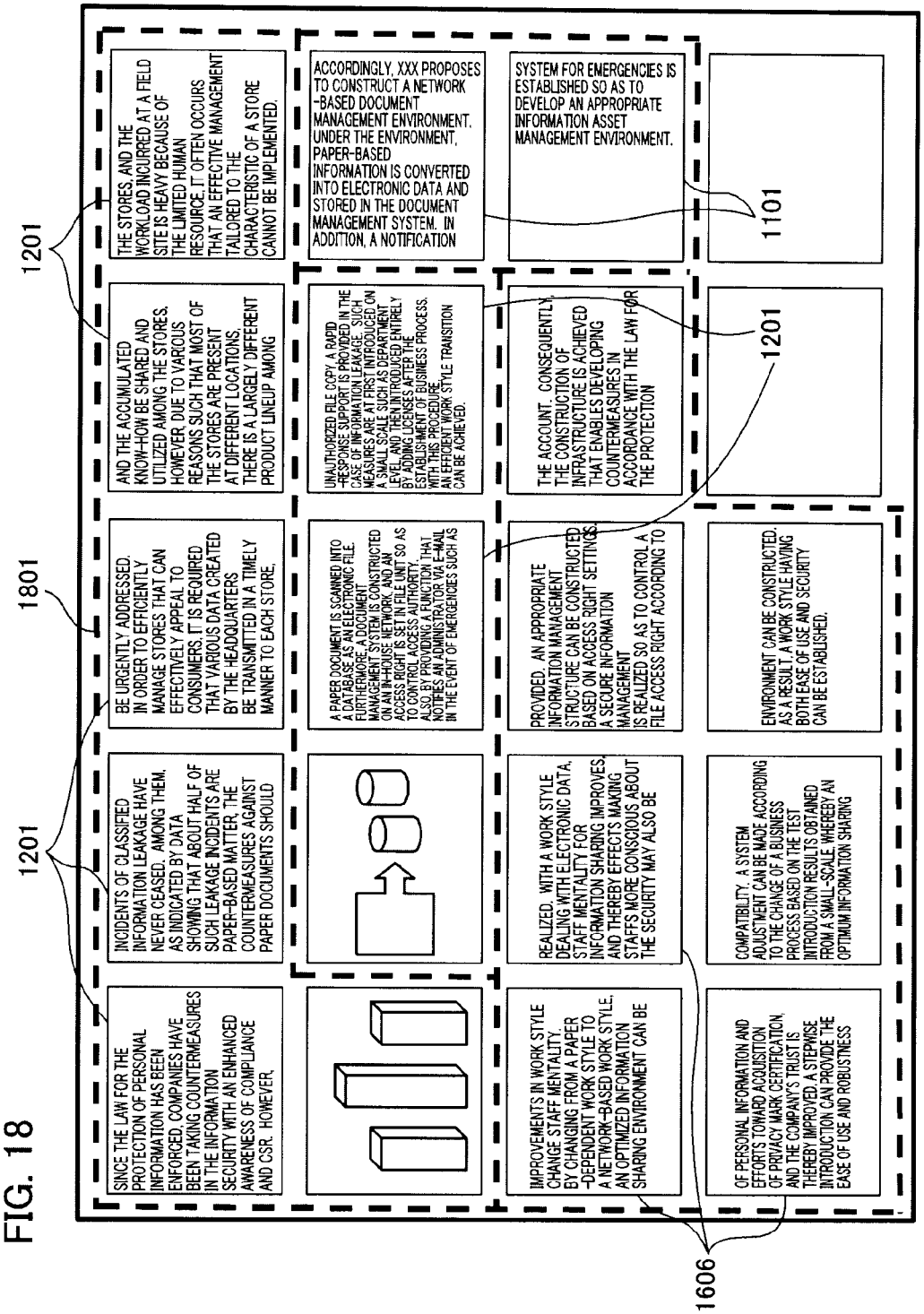
FIG. 18 is an explanatory view showing an exemplary drawing of an article identification auxiliary line according to the second embodiment of the present invention.

Next, the layout editing unit checks the presence or absence of other block data in the non-text article data of interest (step 705). Since there is no other segmented block when the article data is non-text data, the process is ended. Next, the layout editing unit arranges the non-text article data in the data arrangement area T of the template TP as shown in FIG. 18 in accordance with arrangement position information (arrangement position of the field of the in-page arrangement position symbol) that has been recorded in the arrangement position information table (1402) (step 211).

FIG. 34 shows a printed page subjected to synthesis printing by the printer 145 after the layout is finished by the layout processing program according to this embodiment. As shown in FIG. 34, the horizontally-written text article data 1201 is segmented into a plurality of block data, and is printed horizontally. The text article data 1201 is also printed vertically after being segmented into block data.

The size of the character and area of these data is the same as that prior to segmentation, resulting in good readability. Since unwanted margin is not generated, the paper surface can be utilized effectively. The text article data 1201 and the article data 1101 and 1102 consisting only of text data are compressed only when the amount of protrusion in the horizontal direction and the vertical direction is very small. On other hand, when the amount of protrusion is large, these article data are segmented into block data and arranged in a plurality of adjacent data arrangement areas as described above, resulting in no degradation in readability. The non-text article data is also compressed based on the protrusion ratio when the amount of protrusion is very small, resulting in no degradation in readability.

According to the first embodiment, text data is not contracted in the conventional way, resulting in significant improvement in readability. In addition, unwanted margin within a page is significantly reduced than hitherto.

A second embodiment is described as follows. According to the first embodiment, the aforementioned effects can be obtained. However, when a plurality of block data consisting of text data is arranged on the same page as shown in FIG. 34, first block data belonging to the same print data cannot be recognized at a glance but is to be determined from the inter-relationship between block data adjacent to each other. Therefore, there is still room for improvement.

In this embodiment, a plurality of block data into which text article data has been segmented and mutually related text article data are encircled by an auxiliary line to improve the distinguishability.

Figure 19:
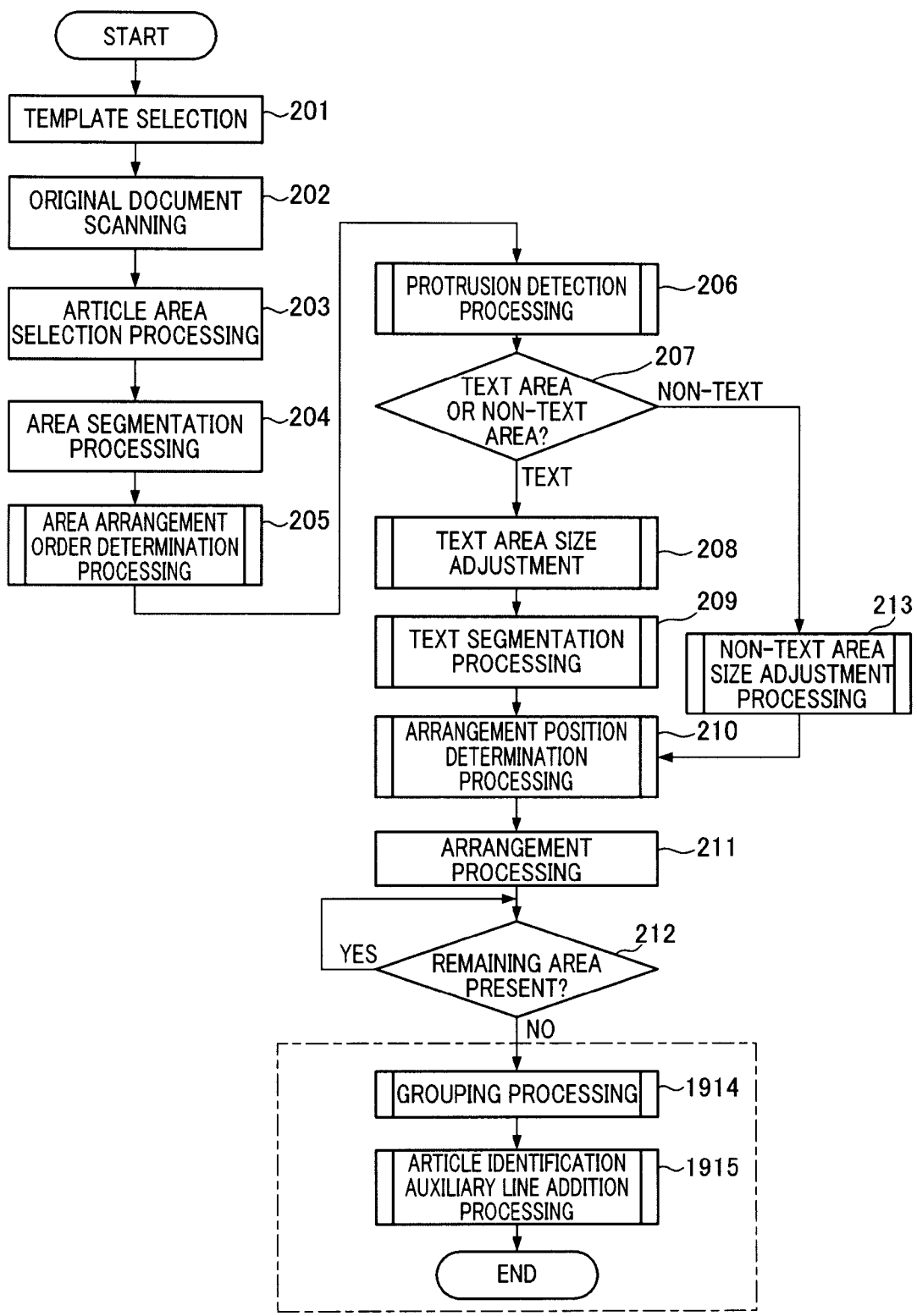
FIG. 19 is a main flowchart showing a layout processing program according to the second embodiment of the present invention.

FIG. 19 is a main flowchart of the layout processing program according to the second embodiment. In FIG. 19, the explanation of the constitution identical to that shown in FIG. 2 is omitted.

The layout processing program according to the present embodiment is the same as the layout processing program shown in FIG. 2 except that grouping processing 1914 and auxiliary line addition processing are added after step 211. First, when there is no remaining area after the execution of the arrangement processing in step 211, an arrangement position information table 2202 is complete as shown in FIG. 22B. Hence, the layout editing unit functions as a grouping unit, and performs grouping processing based on the arrangement position information table 2202 (step 1914).

Figure 20:
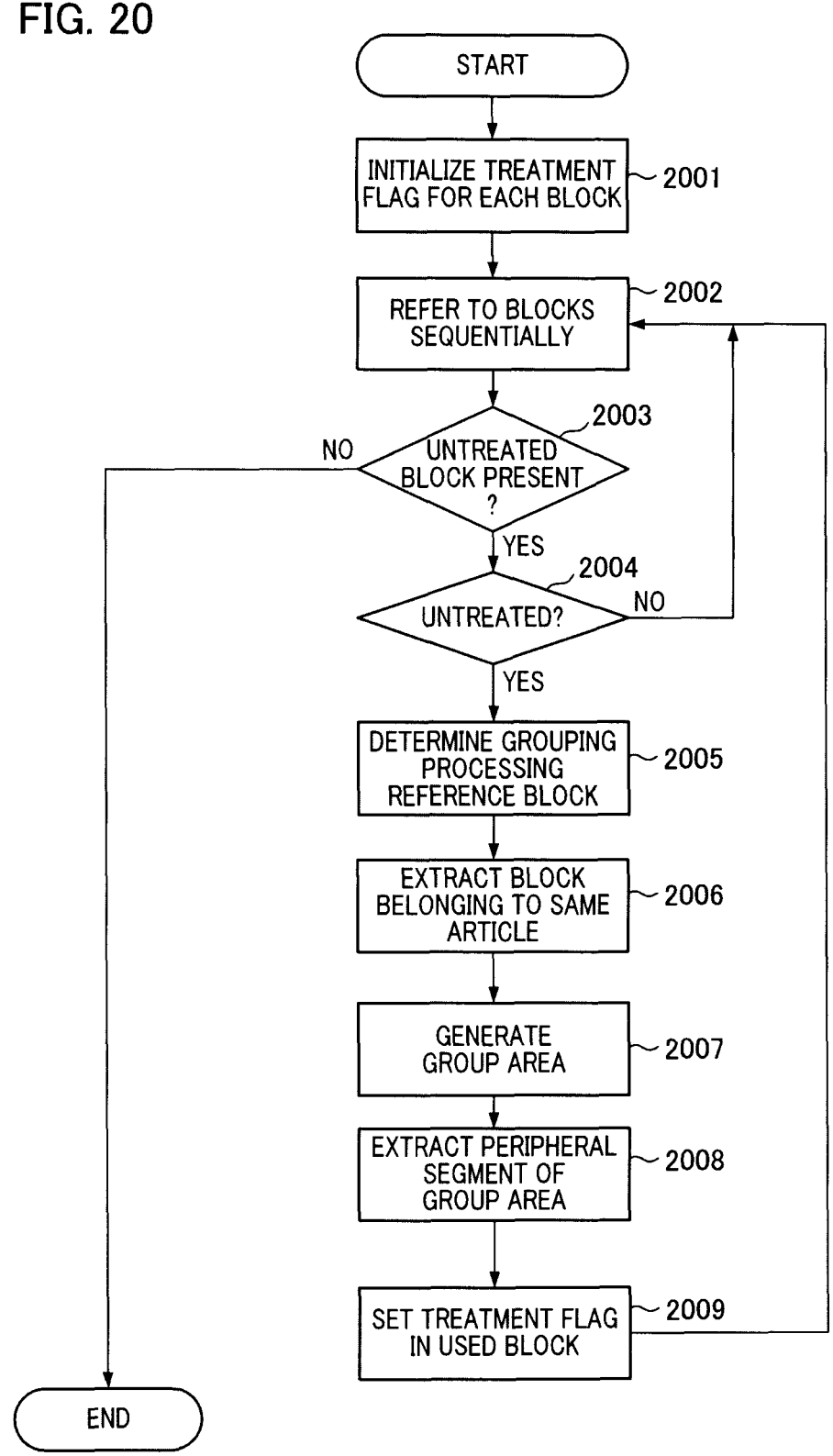
FIG. 20 is a flowchart showing grouping processing of a layout processing program according to the second embodiment of the present invention.

FIG. 20 is a flowchart showing an example of grouping processing.

First, the layout editing unit temporarily initializes a treatment flag for each block data to "untreated" in the arrangement position information table 2202 (step 2001). As used herein, "block data" is intended to include not only block data that has been block-structured by segmentation processing but also non-text data that can be arranged in the data arrangement area T through compression without segmentation processing.

Next, the layout editing unit refers to the field of the block ID of the arrangement position information table 2202. In the field of the block ID, a unique ID for each block data of the text article data is stored in a segmented order. When the reference to block data is finished (step 2002), the layout editing unit advances to step 2003.

In step 2003, when there is any reference block, the layout editing unit determines from the arrangement position information table 2202 whether or not the reference block is untreated (step 2004). In step 2004, when a reference block is untreated, the layout editing unit determines the reference block to be the standard block for grouping processing (hereinafter referred to as "grouping processing standard block") (step 2005).

Next, the layout editing unit searches and extracts the same block data within the text article data as those within the grouping processing standard block from the arrangement position information table 2202 (step 2006).

Next, the layout editing unit functions as a grouping unit, and virtually links the respective arrangement positions of the extracted block data to generate a group area (step 2007).

Next, the layout editing unit extracts the peripheral segment of the generated group area, associates the extracted segment with an article ID, and records it in the article information table 2201 as shown in FIG. 22A (step 2008). At this time, the block data used for virtually coupling, the in-page arrangement position of the virtually linked block data, and the like are also recorded in the article information table 2201.

Next, the layout editing unit records, for example, "treated" in the field of the treatment flag in the arrangement position information table 2202 while the block data used for virtually coupling is set as the used block data (step 2009).

As described above, the layout editing unit groups the block data belonging to the same text article data, and generates an article area at which the block-shaped articles are virtually linked so as to extract the peripheral segment of the area.

Next, the layout editing unit functions as an auxiliary line addition unit, and draws an auxiliary line for article identification on the outer periphery of each of the mutually related block data that have been extracted in step 1914 of auxiliary line addition processing (step 1915).

Figure 21:
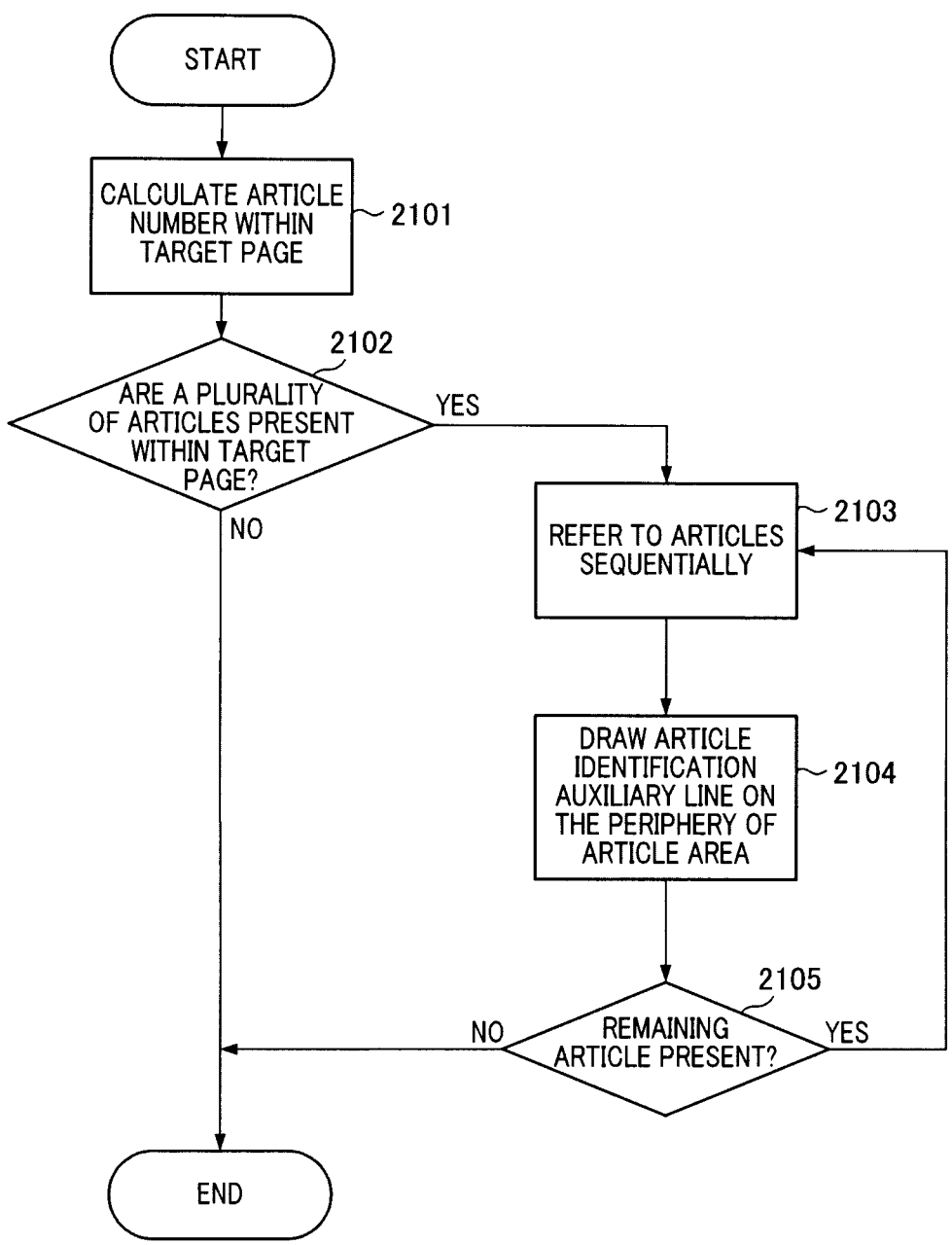
FIG. 21 is a flowchart showing article identification auxiliary line addition processing of the layout processing program according to the second embodiment of the present invention.
Figure 23:
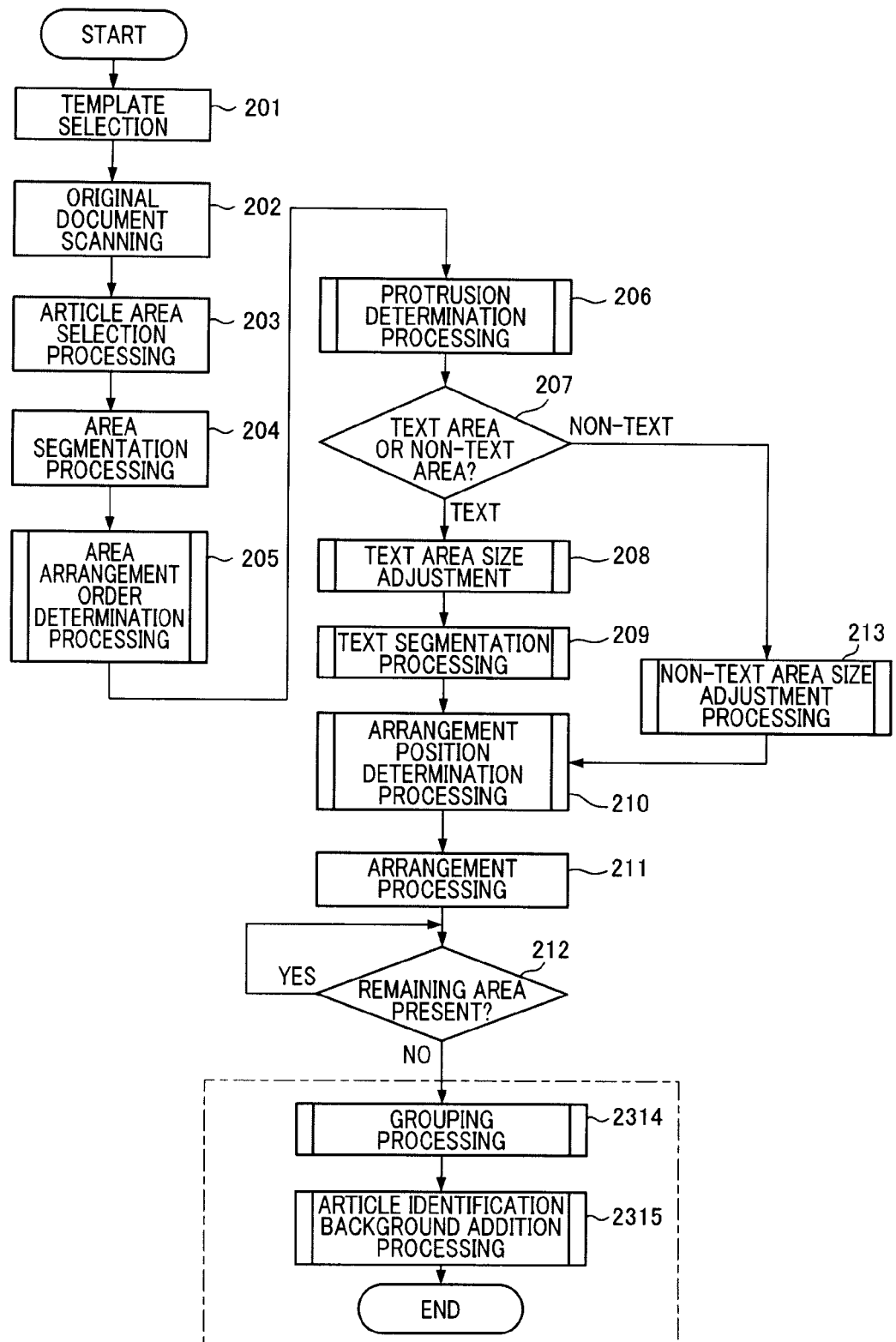
FIG. 23 is a main flowchart showing a layout processing program according to the third embodiment of the present invention.

FIG. 21 is a flowchart showing an example of identification auxiliary line addition processing.

First, the layout editing unit calculates the number of articles within a page, that is, the number of block data for the page to be laid out from the article information table 2203 shown in FIG. 22C (step 2101).

Next, the layout editing unit determines whether or not the number of block data within a target page is plural (step 2102).

In step 2102, when the number of block data within a target page is plural, the layout editing unit sequentially refers to the respective block data for each article data from the article information table 2203 shown in FIG. 22C. Then, the layout editing unit draws an article identification auxiliary line 1801 along the peripheral envelope of a plurality of block data, as shown in FIG. 18, on the basis of the envelope that surrounds the outside of each block data to be arranged in the data arrangement area T (step 2103, step 2104).

Next, in step 2105, when the article data is present, the layout editing unit repeats processing for the next article data.

As shown in FIG. 18, the article identification auxiliary line 1801 is drawn on the outer periphery of block data constituting article data, article data can be distinguished at a glance even when various article data having different shapes and sizes are synthetically printed. Furthermore, the contents can be read out from a plurality of block data constituting article data. Since there is no need to enlarge data for each block data, the occurrence of unwanted margin in a printed page can be suppressed, resulting in improved readability.

A third embodiment is described as follows. In second embodiment, the drawing procedure of the article identification auxiliary line 1801 for distinguishing article data from each other at a glance has been described, however, there is still room for improvement in terms of impact.

In this embodiment, backgrounds distinguishable from each other are provided at the boundary between article data and around article data so as to clearly distinguish article data from each other.

More specifically, in the second embodiment, background addition processing is provided instead of auxiliary line addition processing 1915. Since the other remaining configuration is the same as that of the second embodiment, components that are the same as those in the second embodiment are represented by same number and are not described in any more detail below.

Figure 24:
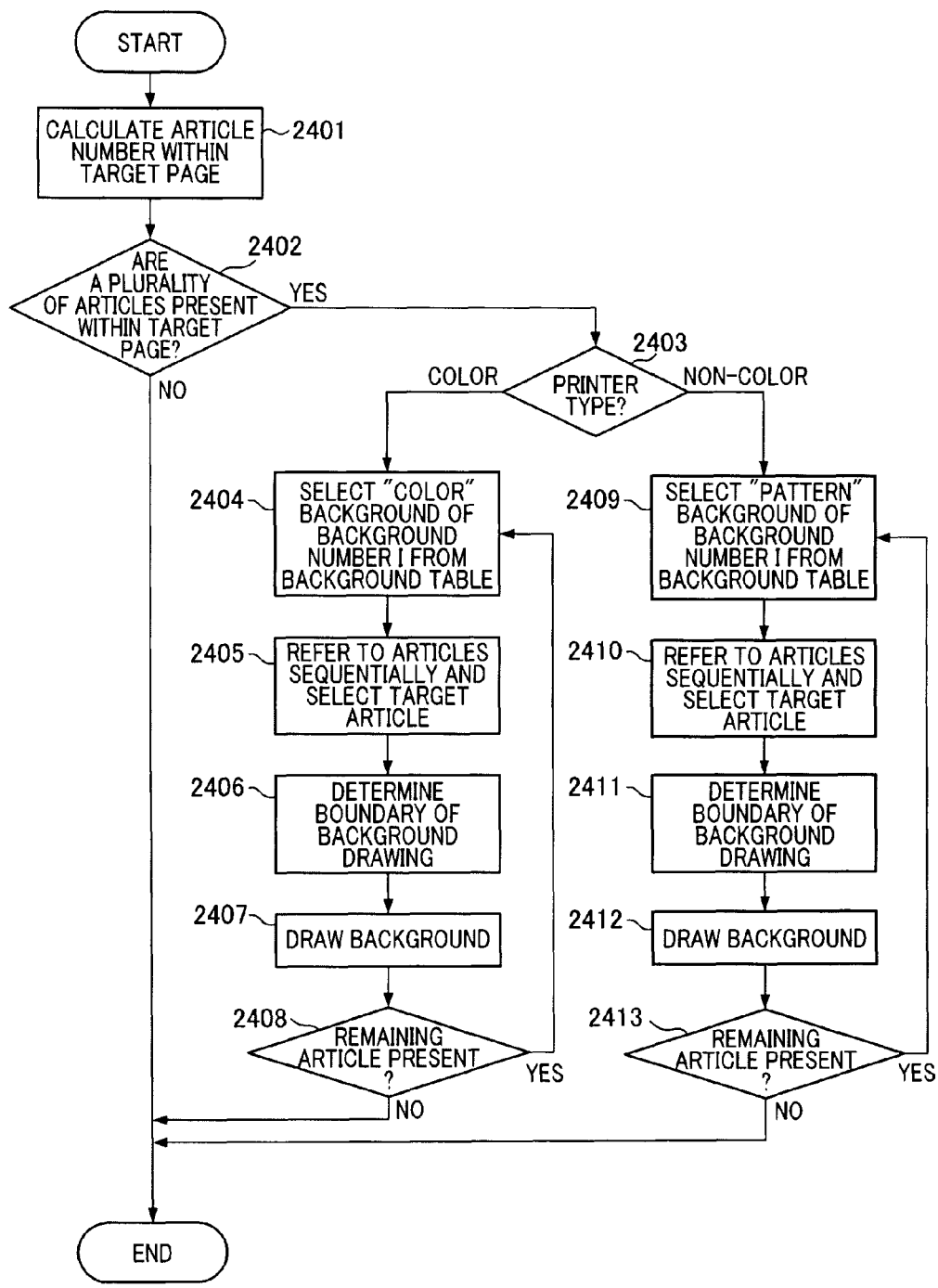
FIG. 24 is a flowchart showing article identification background addition processing of the layout processing program according to the third embodiment of the present invention.

FIG. 24 is a flowchart of background addition processing.

First, the layout editing unit functions as a background addition unit, and draws a background for article identification on the background of the block data of the article data that have been extracted in step 2314 (step 2315). The layout editing unit calculates the number of article data in a target page from the article information table 2203 (step 2401).

Next, the layout editing unit determines whether or not the number of articles in a target page is plural (step 2402).

In step 2402, when the number of articles in a target page is plural, the layout editing unit determines whether or not the type of a printer used for printing is a color model (step 2403).

In step 2403, when the type of the printer 145 used for printing is a color model, the layout editing unit selects the "color" background of a background number i from the background table shown in FIG. 25, for example (step 2404). Here, the background number i is a counter value that sequentially refers to the article and is added.

Next, the layout editing unit refers to the article data group block ID and the like for text article data, non-text article data, text-only article data, and the like, and selects the article data on which the background should be drawn (step 2405).

Next, the layout editing unit determines the boundary of the article area on which the background is drawn (hereinafter referred to as a "background drawing boundary") on the basis of the extracted segment of the selected article data (step 2406).

Figure 26:
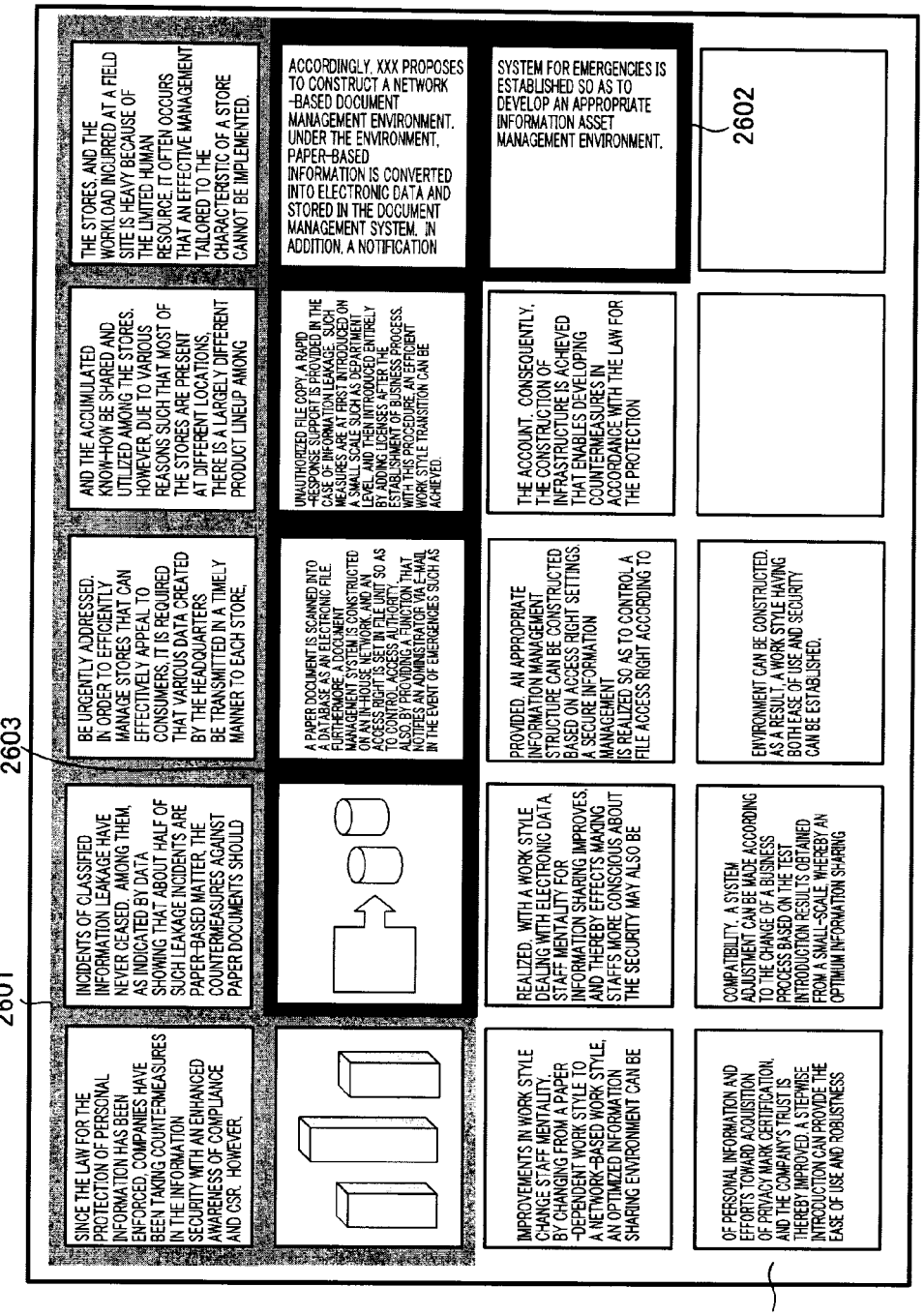
FIG. 26 is an explanatory view showing an exemplary article identification background drawing with a "color" background according to the third embodiment of the present invention.

Next, the layout editing unit draws the "color" background, which has been selected in step 2404, between the background drawing boundary and the block data as shown in FIG. 26 (step 2407).

The layout editing unit draws the background for article identification by repeating the aforementioned processing until there is no remaining article.

In step 2403, when the type of the printer is a monochrome model, the layout editing unit selects the "pattern" background of the background number i from the background table as shown in FIG. 25 (step 2409). Here, the background number i is a counter value that sequentially refers to the article and is added Next, as is the case with the color model, the layout editing unit sequentially refers to the article data from the article information table 2203, and selects the article data on which the background is drawn (step 2410).

Next, the layout editing unit determines the boundary of the article area on which the background is drawn on the basis of the extracted segment of the selected article data (step 2411).

Figure 27:
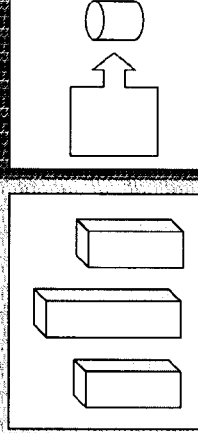
FIG. 27 is an explanatory view showing an exemplary article identification background drawing with a "pattern" background according to the third embodiment of the present invention.

Next, the layout editing unit draws the "pattern", which has been selected in step 2404, as a background between the background drawing boundary and the block data as shown in FIG. 27 (step 2412).

The layout editing unit draws the background for article identification between article data, that is, between a plurality of block data constituting article data, by repeating the aforementioned processing until there is no remaining article.

By drawing the backgrounds 2601, 2602, 2603, and 2604 for discriminating between article data in this manner, the readability of article data can be improved while the occurrence of unwanted margin in a page is suppressed even when various article data having different shapes and sizes are synthetically printed. Even in the case with monochrome printing, the backgrounds 2701, 2702, 2703, and 2704 having different patterns can identify between article data as is the case with color printing.

A fourth embodiment is described as follows. In the second embodiment and the third embodiment, a description has been given in which the block data are virtually linked to generate a new article area so as to discriminate between article data with the background having different auxiliary lines, colors, and patterns. While a predetermined identification can be obtained in this manner, ink depletion in printing is increased, resulting in an undesirable increase in printing cost.

In this embodiment, printing cost is reduced and distinguishability between article data is improved as well.

Figure 28:
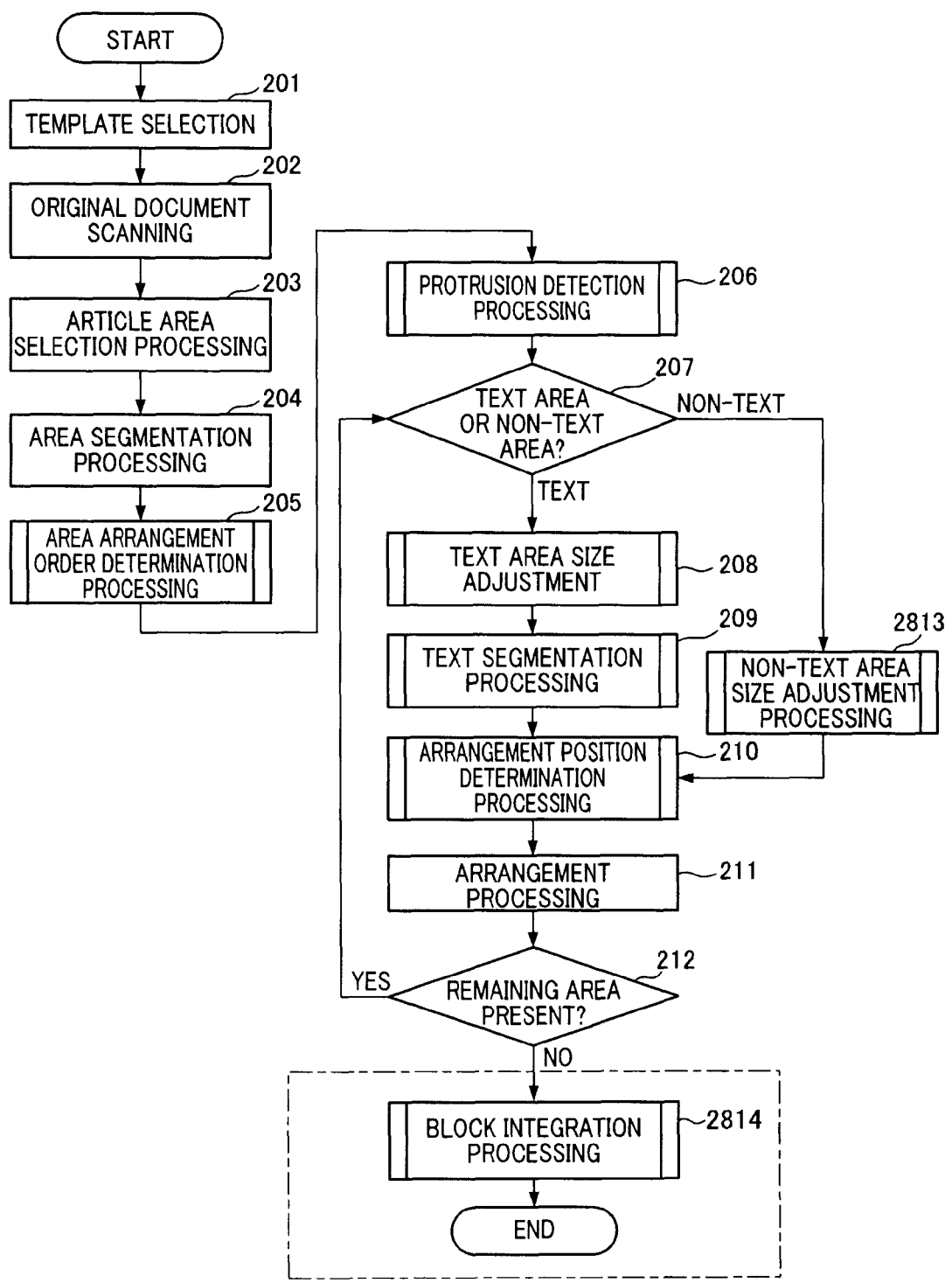
FIG. 28 is a main flowchart showing a layout processing program according to the fourth embodiment of the present invention.

FIG. 28 is a main flowchart of the present embodiment. When there is no remaining area after the execution of arrangement processing in step 2811, the arrangement position information table 2202 is complete. Hence, the layout editing unit functions as a block integration processing unit configured to link block data with each other, and performs block integration processing (step 2814).

First, as first integration processing for block integration processing, the layout editing unit searches and extracts block data belonging to the same article data in a direction along the text row direction.

Figure 29:
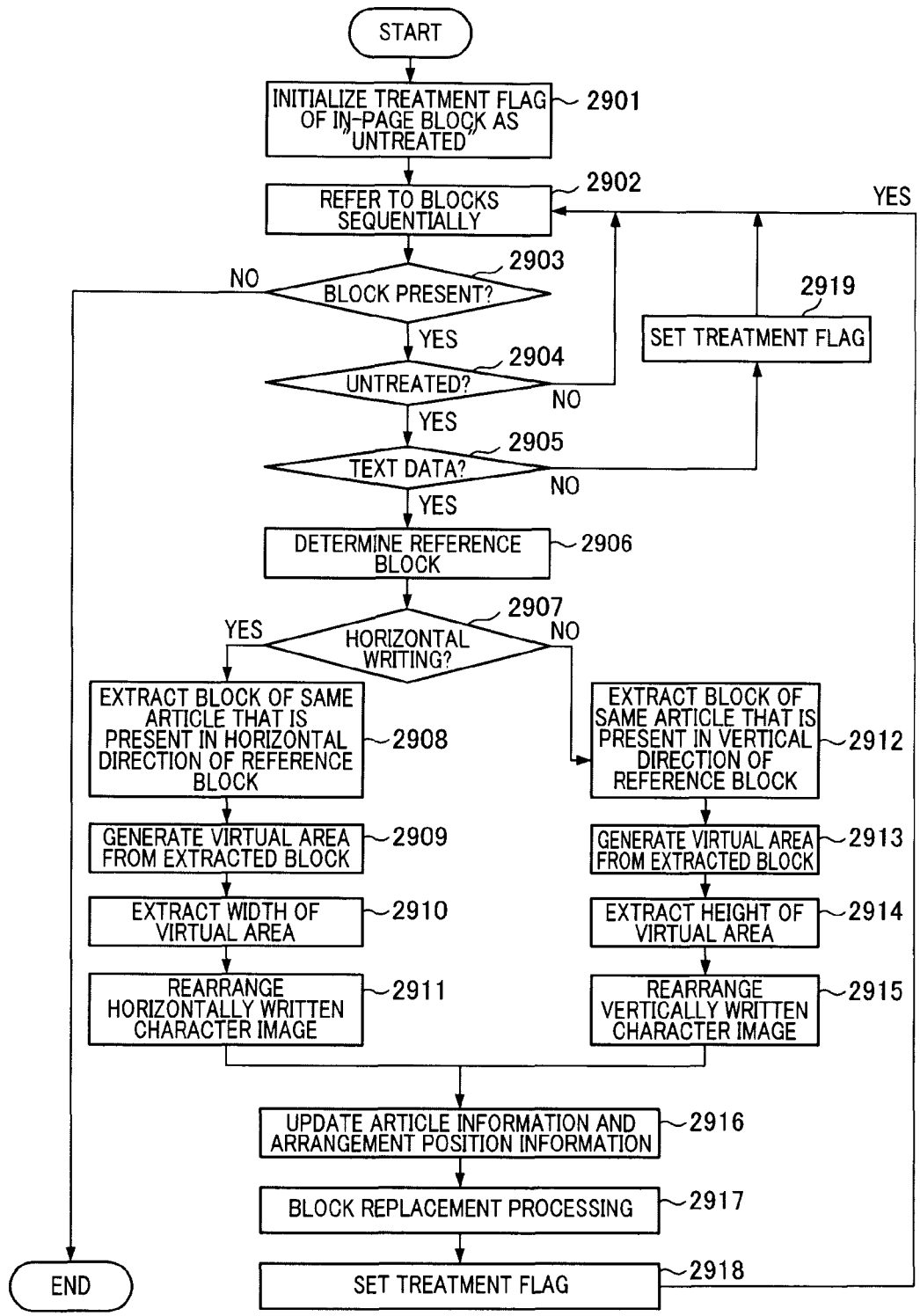
FIG. 29 is a flowchart showing first integration processing for block integration processing of the layout processing program according to the fourth embodiment of the present invention.

FIG. 29 is a flowchart showing first integration processing for block integration processing according to the present embodiment. First, the layout editing unit temporarily initializes a treatment flag for each block data to "untreated" in the arrangement position information table 2202 (step 2901).

Next, the layout editing unit sequentially refers to the block data of the arrangement position information table 2202 (step 2902).

In step 2903, when there is any block data to be referred to, the layout editing unit determines from the arrangement position information table 2202 whether or not the block data to be referred to is untreated (step 2904).

In step 2904, when the reference block is untreated, the layout editing unit determines whether or not the block data is text data (step 2905).

In step 2905, when the reference block is text data, the layout editing unit determines the referred block data to be the standard block for first integration processing (step 2906).

When it is determined in step 2904 that the referred block data is non-text data, the layout editing unit records a "treated" flag in the field of the treatment flag in the arrangement position information table 2202 (step 2919).

Next, the layout editing unit determines whether or not the standard block data is horizontal writing (step 2907).

In step 2907, when the reference block is horizontal writing, the layout editing unit functions as a first block data extraction unit. The layout editing unit searches in the horizontal direction of the reference block, that is, in the direction along the text direction, and extracts the block data belonging to the same article data from the arrangement position information table (FIG. 22B, 2202) (step 2908).

Next, the layout editing unit functions as a virtual area generation unit, and virtually links the respective arrangement positions of the extracted block data to generate a virtual area (step 2909).

Next, the layout editing unit extracts the width of the generated virtual area (step 2910).

Next, the layout editing unit functions as a character string reconstruction unit, and rearranges the character string (character image) within the block data contained in the virtual area in accordance with the width of the extracted virtual area (step 2911).

In step 2907, when the standard block data is vertical writing, the layout editing unit functions as a first block data extraction unit. The layout editing unit extracts the block data (text data) belonging to the same article data that is present in the vertical direction of the standard block from the arrangement position information table 2202 (step 2912).

Next, the layout editing unit virtually links the respective arrangement positions of the extracted block data to generate a virtual area (step 2913)

Next, the layout editing unit extracts the height of the generated virtual area (step 2914).

Next, the layout editing unit functions as a character string reconstruction unit, and rearranges the character data within the block data contained in the virtual area in accordance with the height of the extracted virtual area (step 2915).

Next, the layout editing unit stores the virtual area, in which the text data has been rearranged, in the storage device 139 such as the hard disk drive 140 or the like as new text block data. Then, the layout editing unit updates information in the article information table 3101 shown in FIG. 31A and the arrangement position information table 3102 shown in FIG. 31B (step 2016).

Next, the layout editing unit functions as a block data replacement unit, and replaces the block data (text data) of the new text data with existing block data on the basis of the arrangement position information table 3102 (step 2917).

Next, the layout editing unit records a "treated" flag in the field of the treatment flag in the arrangement position information table (FIG. 31B, 3102) while the integrated block data, in which the rearrangement of the text data is finished, is set as the used block data (step 2918).

As first integration processing for block integration processing of the first integration unit consisting of the first block data extraction unit, the virtual area generation unit, and the block replacement unit, the layout editing unit searches and integrates the block data belonging to the same article data in a direction along the text row direction as described above.

Next, the layout editing unit functions as a second block data extraction unit and an information integration unit. As second integration processing for block integration processing, the layout editing unit integrates the block data, which have been integrated by first integration processing, and a graphic block.

Figure 30:
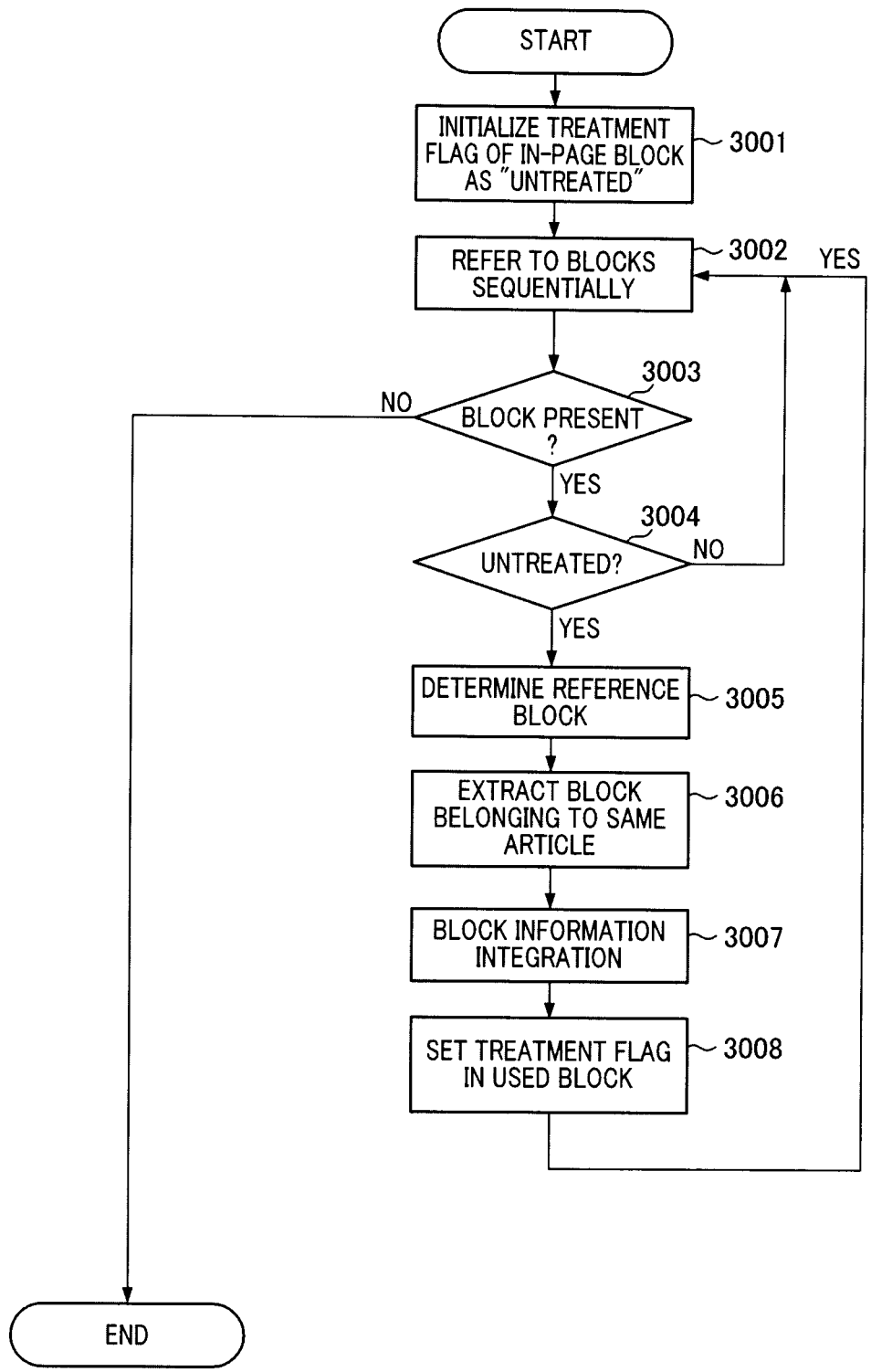
FIG. 30 is a flowchart showing second integration processing for block integration processing of the layout processing program according to the fourth embodiment of the present invention.

FIG. 30 is a flowchart of second integration processing for block integration processing according to the present embodiment. First, the layout editing unit temporarily initializes a treatment flag for each block data to "untreated" in the arrangement position information table 3102 shown in FIG. 31B (step 3001).

Next, the layout editing unit sequentially refers to the block data of the arrangement position information table 3102 (step 3002).

In step 3003, when there is any block data to be referred to, the layout editing unit determines from the arrangement position information table 3102 whether or not the block data to be referred to is untreated (step 3004).

In step 3004, when the flag of the block data to be referred to is untreated, the layout editing unit determines the block data to be referred to as the standard block for second integration processing (step 3005).

Next, the layout editing unit functions as a second block data extraction unit, and extracts the block data belonging to the same article data as the standard data from the arrangement position information table 3102 shown in FIG. 31 (step 3006).

Unlike first integration processing, the block data to be extracted in this state is intended to include block data other than text data.

Also, the block data extending in a direction opposite to the text row direction is also to be integrated.

Next, the layout editing unit functions as an information integration unit. The layout editing unit integrates the information on the extracted block data and the information on the standard block, and updates the block ID of the arrangement position information table 3202 shown in FIG. 32B and the article information table 3201 shown in FIG. 32A, the in-page arrangement position, and the like (step 3007).

Next, the layout editing unit records a "treated" flag in the field of the treatment flag in the arrangement position information table 3102 while the integrated block data, in which the integration with the standard block is finished, is set as the used block data (step 3008).

As second integration processing for block integration processing, the layout editing unit integrates the block data, which have been integrated by first integration processing, and a graphic block as described above.

FIG. 33 shows a printed page that has been printed by the layout processing program according to the fourth embodiment.

As shown, the readability of the text and non-text printed on a printed page can be improved while the occurrence of unwanted margin in the printed page is suppressed even through the article data 3301, 3302, 3303 and 3304 have various shapes and sizes. As shown in FIG. 33, when auxiliary lines for distinguishing print data as described in the second embodiment are provided, a clearer readability can be obtained. When the article data consists of text article data and non-text data, readability is further improved. In addition, the printing cost is significantly reduced compared to the third embodiment.

According to the embodiments of the present invention described above, the readability of a text data can be significantly improved. Further, since unwanted margin in a data arrangement area is also reduced, printing paper can be effectively utilized without producing waste.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer via, for example, a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-297244 filed Nov. 20, 2008which is hereby incorporated by reference herein in its entirety.

What is claimed is:

1. An apparatus that arranges a target image on a template having a plurality of data arrangement areas, the apparatus comprising at least a processor and a memory, cooperating to function as:

a first determination unit that determines an amount of a protrusion of text article data with respect to a data arrangement area of the plurality of data arrangement areas, wherein the text article data is segmented from the target image;

a second determination unit that determines whether or not the amount of the protrusion of the text article data with respect to the data arrangement area is less than a predetermined value;

a control unit that reduces an image corresponding to the text article data when the amount of the protrusion of the text article data is less than the predetermined value and that segments images corresponding to the text article data into a plurality of text row rectangle images when the amount of the protrusion of the text article data is greater than the predetermined value; and an arrangement unit that arranges the reduced image or a plurality of block data on the data arrangement areas, wherein the control unit further reconstructs text article data by moving the segmented text row rectangle images, and wherein the control unit further block-segments the reconstructed text article data into the plurality of block data.

2. The apparatus according to claim 1, wherein the at least the processor and the memory further cooperate to function as a drawing unit that draws an identification line between a first data arrangement area and a second data arrangement area when a plurality of target images are arranged on the template, wherein the reduced image or the plurality of block data for a first target image of the plurality of target images are arranged on the first data arrangement area of the template, and wherein the reduced image or the plurality of block data for a second target image of the plurality of target images are arranged on the second data arrangement area of the template.

3. The apparatus according to claim 1, wherein the at least the processor and the memory further cooperate to function as a drawing unit that draws different colors in a background of a first data arrangement area and a background of a second data arrangement area when a plurality of target images are arranged on the template, wherein the reduced image or the plurality of block data for a first target image of the plurality of target images are arranged on the first data arrangement area of the template, and wherein the reduced image or the plurality of block data for a second target image of the plurality of target images are arranged on the second data arrangement area of the template.

4. A method that arranges a target image on a template having a plurality of data arrangement areas, the method comprising:

determining an amount of a protrusion of text article data with respect to a data arrangement area of the plurality of data arrangement areas, wherein the text article data is segmented from the target image;

determining whether or not the amount of the protrusion of the text article data with respect to the data arrangement area is less than a predetermined value;

reducing an image corresponding to the text article data when the amount of the protrusion of the text article data is less than the predetermined value, and segmenting images corresponding to the text article data into a plurality of text row rectangle images when the amount of the protrusion of the text article data is greater than the predetermined value; and arranging the reduced image or a plurality of block data on the data arrangement areas, wherein text article data is reconstructed by moving the segmented text row rectangle images, and wherein the reconstructed text article data is block-segmented into the plurality of block data.

5. The method according to claim 4, further comprising drawing an identification line between a first data arrangement area and a second data arrangement area when a plurality of target images are arranged on the template, wherein the reduced image or the plurality of block data for a first target image of the plurality of target images are arranged on the first data arrangement area of the template, and wherein the reduced image or the plurality of block data for a second target image of the plurality of target images are arranged on the second data arrangement area of the template.

6. The method according to claim 4, further comprising drawing different colors in a background of a first data arrangement area and a background of a second data arrangement area when a plurality of target images are arranged on the template, wherein the reduced image or the plurality of block data for a first target image of the plurality of target images are arranged on the first data arrangement area of the template, and wherein the reduced image or the plurality of block data for a second target image of the plurality of target images are arranged on the second data arrangement area of the template.

7. A non-transitory storage medium for storing a computer program that arranges a target image on a template having a plurality of data arrangement areas, the computer program causing a computer to execute:

determining an amount of a protrusion of text article data with respect to a data arrangement area of the plurality of data arrangement areas, wherein the text article data is segmented from the target image;

determining whether or not the amount of the protrusion of the text article data with respect to the data arrangement area is less than a predetermined value;

reducing an image corresponding to the text article data when the amount of the protrusion of the text article data is less than the predetermined value, and segmenting images corresponding to the text article data into a plurality of text row rectangle images when the amount of the protrusion of the text article data is greater than the predetermined value; and arranging the reduced image or a plurality of block data on the data arrangement areas, wherein text article data is reconstructed by moving the segmented text row rectangle images, and wherein the reconstructed text article data is block-segmented into the plurality of block data.

8. The non-transitory storage medium according to claim 7, wherein the computer program further causes the computer to execute drawing an identification line between a first data arrangement area and a second data arrangement area when a plurality of target images are arranged on the template, wherein the reduced image or the plurality of block data for a first target image of the plurality of target images are arranged on the first data arrangement area of the template, and wherein the reduced image or the plurality of block data for a second target image of the plurality of target images are arranged on the second data arrangement area of the template.

9. The non-transitory storage medium according to claim 7, wherein the computer program further causes the computer to execute drawing different colors in a background of a first data arrangement area and a background of a second data arrangement area when a plurality of target images are arranged on the template, wherein the reduced image or the plurality of block data for a first target image of the plurality of target images are arranged on the first data arrangement area of the template, and wherein the reduced image or the plurality of block data for a second target image of the plurality of target images are arranged on the second data arrangement area of the template.

* * * * *